(12) United States Patent
McCauley et al.

(10) Patent No.: US 7,900,670 B2
(45) Date of Patent: Mar. 8, 2011

(54) SELF-TIGHTENING TRACTION ASSEMBLY HAVING TENSIONING DEVICE

(75) Inventors: John J. McCauley, Winona, MN (US); Lester Stener, Blaine, MN (US)

(73) Assignee: Peerless Chain Company, Winona, MN (US)

( * ) Notice: Subject to any disclaimer, the term of this patent is extended or adjusted under 35 U.S.C. 154(b) by 120 days.

(21) Appl. No.: 12/269,653

(22) Filed: Nov. 12, 2008

(65) Prior Publication Data

US 2009/0084479 A1 Apr. 2, 2009

Related U.S. Application Data

(63) Continuation-in-part of application No. 11/670,844, filed on Feb. 2, 2007.

(60) Provisional application No. 60/765,346, filed on Feb. 2, 2006.

(51) Int. Cl.
*B60C 27/10* (2006.01)

(52) U.S. Cl. ...... 152/219; 152/217; 242/378; 242/384.7; 24/68 SK; 24/68 TT; 24/909

(58) Field of Classification Search .......... 152/170, 152/185, 213 A, 213 R, 216, 217, 218, 219, 152/231; 24/68 SK, 68 TT, 909; 242/382, 242/384.7, 396.4, 378, 388, 385.4
See application file for complete search history.

(56) References Cited

U.S. PATENT DOCUMENTS

| | | | |
|---|---|---|---|
| 1,618,941 A | 2/1927 | Meade | |
| 2,434,119 A | 1/1948 | Nordmark | |
| 2,480,335 A | 8/1949 | Nordmark | |
| 2,511,527 A | 6/1950 | Castongay | |
| 2,701,693 A | 2/1955 | Nordmark et al. | |
| 3,415,462 A | 12/1968 | Barecki et al. | |
| 3,478,981 A | 11/1969 | Barecki et al. | |
| 3,490,715 A | 1/1970 | Nicpon | |
| 3,693,596 A | 9/1972 | Croce et al. | |
| 3,853,283 A | 12/1974 | Croce et al. | |
| 4,188,061 A | 2/1980 | Shehe | |
| 4,588,010 A | 5/1986 | Melzi et al. | |
| 4,648,434 A | 3/1987 | Melzi et al. | |
| 4,665,589 A | 5/1987 | Gregorutti | |
| 4,825,923 A | 5/1989 | Blankenship et al. | |
| 5,068,948 A | 12/1991 | Blankenship et al. | |

(Continued)

FOREIGN PATENT DOCUMENTS

DE 3336056 4/1985

(Continued)

*Primary Examiner* — S. Joseph Morano
*Assistant Examiner* — Kip T Kotter
(74) *Attorney, Agent, or Firm* — Moore & Hansen, PLLP

(57) ABSTRACT

Self-tightening traction assemblies or snow chains having tensioning devices that can be used with snow chains for attachment to a vehicle wheel to provide traction. The preferred tensioning device including a housing having a top including a set of housing teeth, a bottom and at least one aperture; an actuator interconnected to the housing; a ratchet spool within the housing having a set of ratchet teeth that mate with the housing teeth and a channel between upper and under surfaces to receive at least one cord that is interconnected with the ratchet spool; a tension spring that places a bias on the ratchet spool toward a wind-up direction; and a wave spring. Preferred embodiments include a bracket that can secure the actuator to the housing and provide strength to the tensioning device. The tensioning devices of the present invention can be utilized in a variety of applications not limited to self-tightening snow chains.

57 Claims, 19 Drawing Sheets

U.S. PATENT DOCUMENTS

| | | |
|---|---|---|
| 5,082,039 A | 1/1992 | Franklin |
| 5,224,662 A | 7/1993 | Kaussen |
| 5,361,612 A | 11/1994 | Voiculescu et al. |
| 5,377,626 A | 1/1995 | Kilsby et al. |
| 5,400,521 A | 3/1995 | Waldherr |
| 5,920,962 A | 7/1999 | Franklin |
| 6,009,922 A | 1/2000 | Gogan |
| 6,092,577 A | 7/2000 | Franklin |
| 6,213,421 B1 | 4/2001 | Franklin |
| 6,530,406 B1 | 3/2003 | Gentry |
| 6,915,825 B1 | 7/2005 | Stevenson, Jr. |
| 2005/0008185 A1 | 1/2005 | Jeong et al. |
| 2006/0015988 A1 | 1/2006 | Philpott et al. |

FOREIGN PATENT DOCUMENTS

| | | |
|---|---|---|
| DE | 3906486 | 2/1991 |
| DE | 4039665 | 6/1992 |
| DE | 10 2004 037 332 B3 | 5/2005 |
| EP | 0 913 275 A2 | 5/1999 |
| FR | 2435633 | 4/1980 |
| JP | 09193631 A * | 7/1997 |
| WO | WO 01/76895 A1 | 10/2001 |
| WO | WO 2005/095129 A1 | 10/2005 |

* cited by examiner

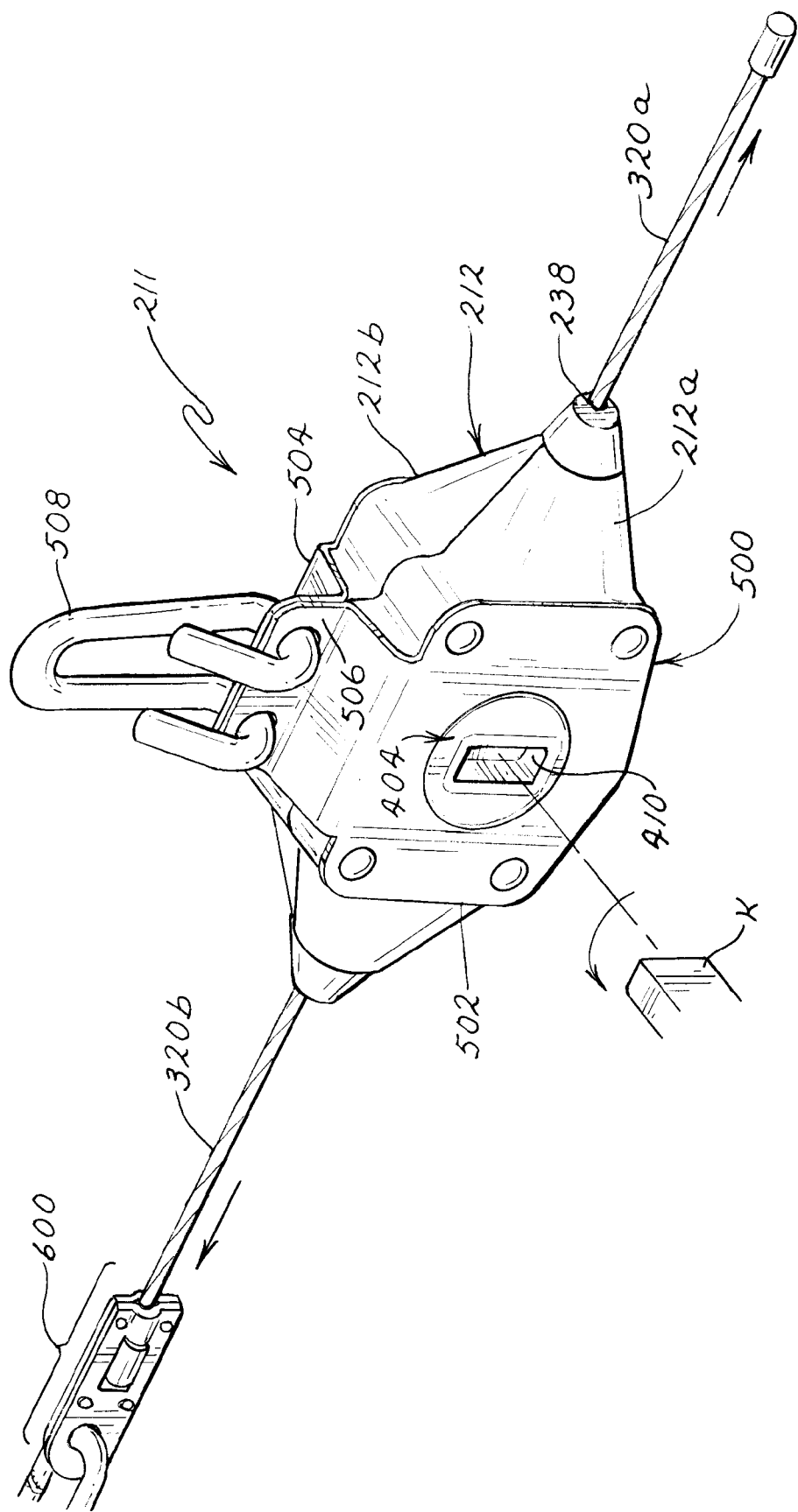

US 7,900,670 B2

SELF-TIGHTENING TRACTION ASSEMBLY HAVING TENSIONING DEVICE

RELATED APPLICATIONS

This application is a continuation-in-part of application Ser. No. 11/670,844, filed on Feb. 2, 2007, entitled "Self-Tightening Snow Chain and Methods of Use," and published as U.S. Publication No. 2007/0199635 A1 on Aug. 30, 2007, which application claims priority to U.S. Provisional Application 60/765,346, filed on Feb. 2, 2006, and each of which are hereby incorporated by reference.

FIELD OF THE INVENTION

The present invention relates generally to self-tightening snow chains or traction assemblies and tensioning devices for use in such traction assemblies or snow chain devices. Various embodiments relate to self-tightening traction assemblies or snow chains having a tensioning device including a winding device and a tensioning cord. The self-tightening snow chains having a tensioned mode, when secured for use on a wheel of a land vehicle, and a separate extended mode, wherein the tensioning cord, interconnected with the winding device is released to extend away from the winding device to permit the snow chain to be easily engaged with the wheel of the land vehicle prior to securing the snow chain to the wheel. In alternate embodiments, the self-tightening traction assemblies self-tighten a plurality of cords tensioned by a single winding device. Methods of using the preferred embodiments are also disclosed.

BACKGROUND OF THE DISCLOSURE

Self-tightening traction assemblies or snow chains have been used to provide vehicles with improved traction when driving on irregular surfaces where poorer traction is anticipated (i.e. ice or snow covered surfaces, off-road or backcountry terrains). Numerous states require the use of snow chain under certain weather conditions to mitigate potential hazards. Most models of snow chains require retightening after initial chain installation, where all of the wheel chains need to be retightened after the vehicle has been slowly driven forward or backward. It is essential that snow chains fit properly to obtain proper performance and increase durability. Having to retighten the cables is burdensome for the user and has costly consequences if forgotten or neglected.

Because proper fit of the snow chains is so essential, self-tightening snow chains have been developed. One of these devices is disclosed in U.S. Pat. No. 6,213,421 to Franklin. The Franklin patent discloses a clamping lock for a traction device. The lock has a single clamping rope connected to a winding device within a housing. The winding device is pretensioned in the wind-up direction. Toothing is provided laterally around the winding device. There is an actuating lever attached to the housing that has three positions: a first catch position, which allows the clamping rope to move in or out of the housing; a second wind-up position, which unlocks the rope so it may move into the housing, thereby tightening the clamping rope; and a third locked position wherein the clamping rope is locked in its current position. The lever controls a pawl. Whether or not the clamping rope may be pulled in or out of the housing depends on whether the pawl is engaged with the teeth on the winding device. Self-tightening snow chains having tensioning devices of this kind are difficult to secure to a wheel of a vehicle with two hands. A user may need to let go of the cord in order to better grip the tensioning device or grab the corresponding hook on the snow chain. In order to prevent the cord from being pulled back into the housing, the user must lock the cord in both directions to keep the cord in the extended position. Then, the cord would need to be unlocked to extend further, again requiring releasing either the cord or the corresponding hook. Additionally, self-tightening snow chain tensioning devices that can only tighten one cord are less cost effective because numerous self-tightening tensioning devices are required on each snow chain to tighten each cord. Of further concern, self-tightening snow chain tensioning devices of this kind are made by simply screwing two flat-edged housing pieces together. Dirt, debris and moisture may easily penetrate this type of joint and cause damage to the mechanisms inside the housing. Additionally, the use of actuating levers creates an easy path for dirt, debris and moisture to enter and damage the device. It is also noted that the tensioning cord is generally equipped with crimped on or cast on ends and that one of these ends is then passed through a grommet and that the grommet and the cord are then incorporated into the tensioning device during assembly. In order to accept the crimped or cast on end, the opening in the grommet is required to be quite a bit larger than the diameter of the cord and the difference in size provides another area where an easy path is provided for dirt, debris and moisture to enter and damage the device.

SUMMARY OF THE INVENTION

Self-tensioning snow chain and traction cable devices are disclosed and claimed herein. Various embodiments include a self-tensioning snow chain for attachment to a wheel of a vehicle. The self-tensioning snow chain includes a snow chain and a tensioning device. One embodiment of the tensioning device preferably includes: a housing having a top including a set of housing teeth, a bottom and at least one aperture defined by the top and the bottom when joined together; an actuator engaged with the housing; at least one tensioning cord; and a ratchet spool having a set of ratchet teeth on an upper surface. The ratchet teeth are preferably constructed and arranged to mate with the housing teeth. The ratchet spool preferably including an under surface and a channel between the upper surface and the under surface in which sufficient space is provided to receive at least one tensioning cord, wherein each tensioning cord is interconnected with the ratchet spool and the ratchet spool is upwardly biased so that the ratchet teeth are engaged with the housing teeth when the ratchet spool is in an up position. Preferred tensioning devices also include a tension spring interconnected with the housing and the ratchet spool and constructed and arranged to place a bias on the ratchet spool in a wind-up direction; and a wave spring positioned between a top surface of the bottom of the housing and the under surface of the ratchet spool to bias the ratchet spool upward toward the housing teeth; wherein the snow chain is interconnected with the tensioning device and the tensioning cord or cords can be connected with the snow chain so that the tensioning device can secure the snow chain to the wheel. The snow chain can also be a traction cable or the like that is made out of rope, wire, wire rope, chains or the like. The assemblies described herein are self-tightening traction assemblies that include self-tightening snow chains. As noted above, a snow chain can also be a traction cable or the like. The present assemblies may include any known system for attachment to a wheel to provide enhanced traction when the vehicle is driven, wherein the incorporation of the disclosed tensioning devices into any such system are new to the art. The preferred tensioning device 211 for placing tension on a snow chain 14 for attachment to a wheel 16 of a vehicle to provide additional traction includes a housing 212 including at least one aperture 238; a bottom 212b having a top surface; and a top 212a having an opening 214 and a set of housing teeth 318 on an underside of the top 212a. The tensioning device 211 also includes at least one tensioning cord 320a, 320b and a ratchet spool 300 including an upper surface and an under surface. The ratchet spool 300 has a set of ratchet teeth 302 on the upper surface and the ratchet teeth are constructed and arranged to mate with the housing teeth 318. The tensioning cord(s) 320a, 320b are interconnected with the ratchet spool 300 and a tension spring 110 is interconnected with the ratchet spool and the housing 212. In preferred embodiments of this tensioning device 211, the ratchet spool 300 preferably includes a channel 324 in which sufficient space is provided to receive at least one tensioning cord 320a, 320b between the upper surface and the under surface. The tension spring 110 is constructed and arranged to place a bias on the ratchet spool 300 toward a wind-up direction. The tensioning device 211, preferably includes at least one wave spring 112 positioned between the top surface of the bottom 212b of the housing 212 and the under surface of the ratchet spool 300 so as to bias the ratchet spool upward toward engagement with the housing teeth 318. The preferred tensioning device 211 further includes an actuator 400 engaged at least partially within the opening 214 and recess 216 in the top 212a of the housing 212. The preferred actuator 400 includes a rotation disc 404 and a cam disc 402. The cam disc 402 has an up position and a down position and the rotation disc 404 has a first position and a second position. When the cam disc 402 is in the up position, the wave spring 112 can push the ratchet spool 300 upward such that the ratchet teeth 302 are engaged with the housing teeth 318 and, when the cam disc 402 is in the down position, the ratchet teeth 302 are disengaged from the housing teeth 318. Preferably, the rotation disc 404 can rotate within the recess 216 and the opening 214 so as to move from the first position to the second position; wherein the rotation disc 404 depresses the cam disc 402 from the up position to the down position when the rotation disc rotates from the first position to the second position. The tensioning device 211 can be interconnected with the snow chain 14 so that the tensioning cord(s) 320a, 320b can place a tension on the snow chain 14 to secure the snow chain to a wheel 16. In preferred embodiments of this preferred tensioning device 211, the opening 214 will be surrounded by the set of housing teeth 318 on the underside of the top 212a of the housing 212. In preferred embodiments of this tensioning device 211, the cam disc 402 will have an uneven upper rotation disc engaging surface 431 and a ratchet spool engaging surface 438 and the rotation disc 404 will have an uneven lower cam disc engaging surface 422 that engages the uneven upper rotation disc engaging surface 431 of the cam disc 402 so that when the rotation disc 404 is rotated, the uneven lower cam disc engaging surface 422 can move from a first position with respect to the uneven upper rotation disc engaging surface 431 to a second position with respect to the uneven upper rotation disc engaging surface 431. As the rotation disc 404 moves from the first position to the second position, the rotation disc 404 moves the cam disc 402 from the up position to the down position, thereby disengaging the ratchet teeth 302 from the housing teeth 318 so that the tensioning cord(s) 320a, 320b can be drawn out of the housing 212 against the biasing force provided by the tension spring 110 on the ratchet spool 300. Preferably, the self-tensioning show chain further includes a bracket secured to respective outer surfaces of the top and the bottom of the housing to generally shield the outer surfaces of the housing. The bracket preferably including a cross chain attachment link that is secured to the snow chain.

It is an object of the present invention to provide a self-tightening snow chain having a tensioning device that more effectively tightens and provides easier installation. It is another object of the present invention to provide a tensioning device that can tighten a plurality of cords with one winding device, preferably a ratchet spool. It is yet another object of the present invention to provide a self-tightening snow chain having a tensioning device that is resistant to an infiltration of dirt, debris and moisture into the housing.

The present invention achieves these and other objectives by providing a tensioning device having two modes of operation. First, is an extended or extending mode that allows the user to extend the tensioning cord or cords from the housing and release their grip on the cord(s) without having the cord(s) wind-up into the housing. The ability to only allow movement in a wind-out direction is created when the ratchet spool is in a down position, where the spool, although biased in a wind-up direction, is blocked from turning in a wind-up direction. In one embodiment, in which the actuator includes an actuating lever and a cam lever, in order to position the ratchet spool in the down position, the user raises the actuating lever until the actuating lever is perpendicular to the housing and the cam lever pushes the ratchet spool down. In another embodiment, to position the ratchet spool in the down position, the user rotates a key within a key receiving opening in an actuator that includes a rotation disc that engages a cam disc such that the cam disc pushes the ratchet spool down. When the ratchet spool is in the down position, the ratchet teeth are disengaged from the housing teeth thereby allowing movement of the ratchet spool in either rotational direction. However, movement in the wind-up direction is prevented by catches on the under surface of a ratchet spool that are pushed into a zone of a stop or stopper which engages one of the catches when the catches are in this zone, thereby stopping the ratchet spool from turning or rotating in a wind-up direction more than a full turn (i.e. a turn of 360 degrees), a half turn, a quarter turn or preferably a sixth of a turn. When the user wants to continue extending the cord(s), the cord(s) simply need(s) to be pulled further in the outward or wind-out direction.

Second, is a self-tightening mode wherein the tensioning cord(s) may generally only move or rotate in the wind-up direction. This mode is preferred for when the cord is engaged and in use and the user wants to maintain constant tension on the snow chain without the possibility of the tensioning cord(s) extending out or winding out. To operate in this mode, the user positions the actuator such that the ratchet spool is in the up position. In embodiments where the actuator includes the lever, this action lowers the actuating lever until it is in a position adjacent to the housing. In embodiments, where the actuator includes the rotation disc and cam disc, the rotation disc is rotated with a key until the cam disc disengages from the ratchet teeth. When the actuating lever is down or the cam disc is up in the respective embodiments, the ratchet spool is biased upward into an up position by the wave spring positioned beneath the ratchet spool. Therefore, the housing teeth and the ratchet teeth are engaged to only allow movement in the wind-up direction. When the ratchet spool is in the up position, the catches are no longer in the zone of the stopper and cannot be blocked by the stopper, which would otherwise prevent more than a small movement of the ratchet spool in the wind-up direction.

In preferred embodiments of the present invention, the ratchet and housing teeth may be overcut or undercut. In preferred embodiments, the respective teeth will be undercut at an angle ranging from about 3 to about 30 degrees, preferably about 5 to about 25 degrees more than the 90 degree angle to a horizontal plane "b" perpendicular to a vertical axis "c" of the ratchet spool and the housing. In the most preferred embodiment, the respective teeth will be undercut about 20 degrees more than the 90 degree angle to a horizontal plane "b" perpendicular to a vertical axis "c" of the ratchet spool and the housing as shown in FIG. 9B. When the teeth are undercut, and the device is in a wind-up mode and the cord is tugged outwardly, the harder the cord is tugged, the more the ratchet teeth will become engaged and resist the cord being moved significantly in the wind-out direction. This is particularly important during normal conditions for vehicles, when a significant amount of vibration results from interaction between the tire and the road surface.

In another embodiment of the tensioning devices disclosed herein, a plurality of cords, all interconnected with the same winding device or ratchet spool, may extend from different apertures or openings of the housing. Although it is possible to have more than three cords extend from a single tensioning device, such a device may be difficult to optimize because of the limited room on the ratchet spool, unequal forces that could be placed on each cord when in use and also the potential need for a tension spring that can generate greater winding force on the spool that may be needed to wind a greater number of cords.

Additionally, a lip and groove configuration may be utilized to aid in sealing the housing from dirt, debris and moisture. For example, a lip may trace along the opening of the housing top and a groove may trace along the opening of the housing bottom. When the two housing components are joined together, the lip and groove will mate to form a more secure seal than if two flat surfaces are pressed together. Alternatively, the lip may trace along the opening of the housing bottom and the groove may trace along the opening of the housing top.

To further protect the internal components, a grommet having an opening only slightly larger than the diameter of the cord may be utilized. If the grommet is secured around the cord prior to securing knobs at both ends of the cord, the grommet opening can be smaller than the diameter of the knobs, thereby reducing the size of the passageway in the grommet where dirt, debris and moisture can breach the housing. The grommet is provided as a part of a sub-assembly of the disclosed tensioning devices. It preferably includes a cord, about which the grommet is slidably engaged, and a stop or knob at each end of the cord or respective cords. Neither of the knobs can pass through the grommet and the grommet minimizes the dirt and debris that can pass through the grommet on the tensioning cord(s) during use when the sub-assembly is incorporated into a tensioning device.

It is envisioned that tensioning devices of the present invention can be used in articles not limited to snow chains.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 12A is a perspective view of a ratchet spool 100', similar to that shown in FIG. 3, but for a dual cord tensioning device 11' of the present invention, wherein two tensioning cords 20a, 20b are wrapped around a single ratchet spool 100'; when the cords are fully wound in;

FIG. 12B is a perspective view of a ratchet spool 100" for a triple cord tensioning device 100" of the present invention wherein three tensioning cords 20a, 20b, 20c are wrapped around a single ratchet spool 100" when the cords are fully wound in;

FIG. 17 is a perspective view of an alternate tensioning device having an alternate actuation mechanism and a plurality of tensioning cords or cord sub-assemblies;

DETAILED DESCRIPTION OF THE PREFERRED EMBODIMENTS

Figure 1:
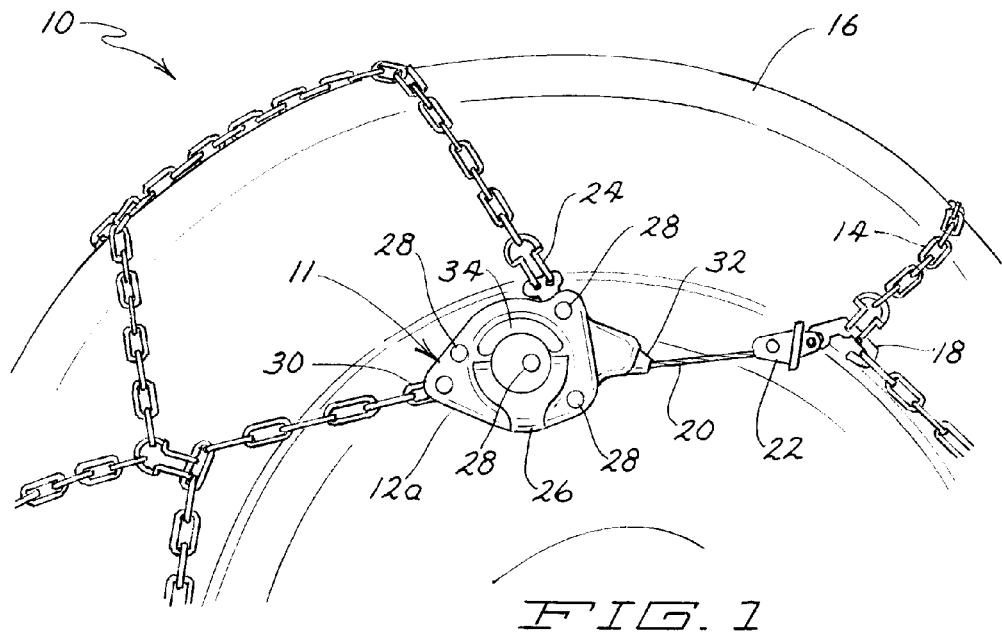
FIG. 1 is a perspective view of one embodiment of a self-tightening snow chain 10 of the present invention having a tensioning device 11, wherein the self-tightening snow chain is in use attached to a wheel 16 (partially shown)
Figure 2:
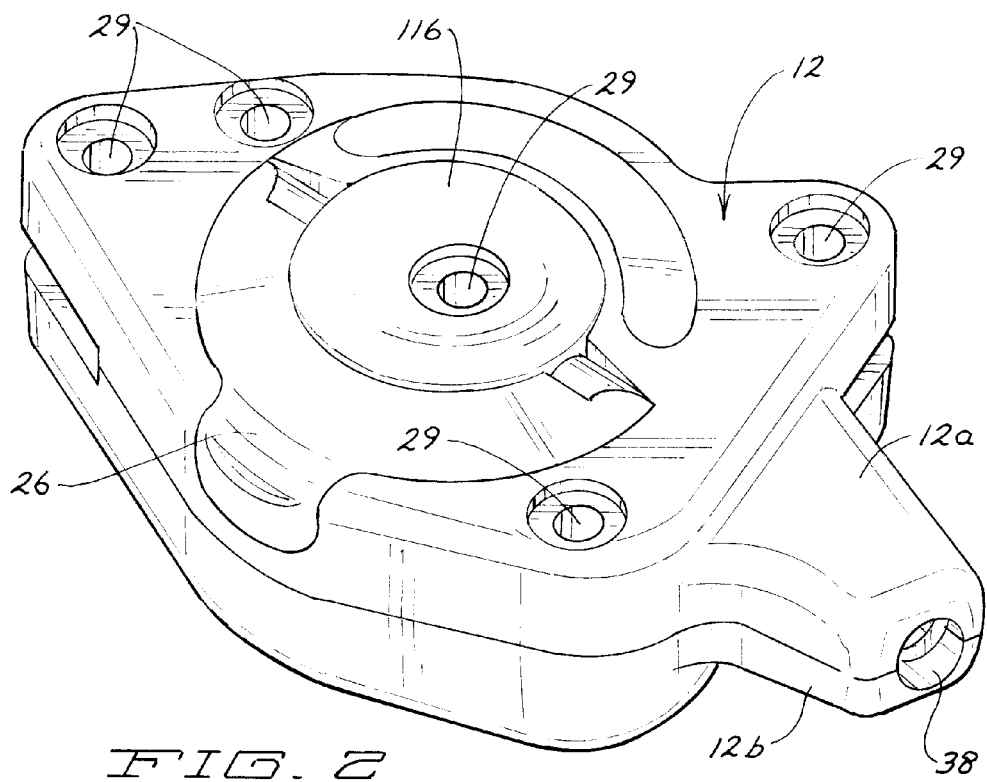
FIG. 2 is a perspective view of the tensioning device 11 of FIG. 1.
Figure 3:
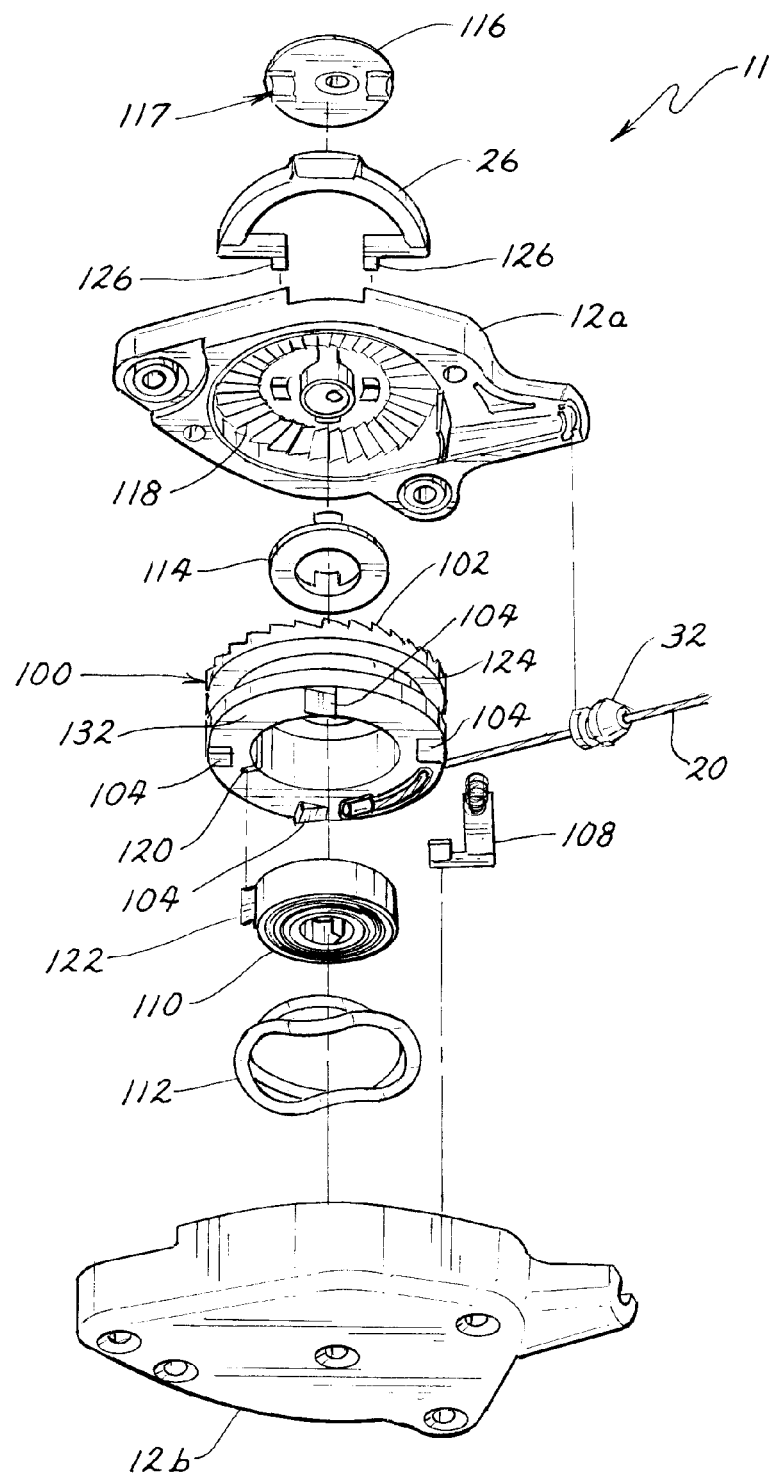
FIG. 3 is an exploded perspective view of the tensioning device 11 of FIGS. 1-2.

Various embodiments of the present invention are illustrated in FIGS. 1-23. FIG. 1 is a perspective view of a self-tightening snow chain 10 of the present invention in use on a wheel 16 (partially shown). The self-tightening snow chain 10 comprises of a snow chain 14 and a tensioning device 11. Referring now also to FIGS. 2 and 3, the tensioning device 11 has a housing 12 including a housing top 12a, an actuating lever 26, a grommet 32, and a cord 20 extending through grommet 32 and connected to a hook 18 with a first connection member 22. The hook 18 connects to the chain 14 of the self-tightening snow chain 10, to supply tension to the chain 14. In this embodiment, there is a second connection point 24 and third connection point 30 where parts of the snow chain 14 are secured to the housing 12. Rivets 28 are placed through rivet receiving openings or recesses 29 to secure the housing top 12a to the housing bottom 12b, although any other fasteners such as threaded screws, bolts and nuts, adhesives, double backed tape and the like could be used. The housing top 12a has a recess 34 to prevent distortion during injection molding, which may additionally be used as a place for company identifiers and the like, if desired.

FIG. 2 is a perspective view of the housing 12 of the tensioning device 11 shown in FIG. 1. The housing top 12a can be secured to the housing bottom 12b by rivets or threaded screws (not shown) that may inserted through the holes 29. The housing top 12a and the housing bottom 12b define an aperture 38 for receiving the grommet 32 that provides a passageway for the tensioning cord 20. Additionally, an actuating lever 26 including a cam 126 is pivotally connected to the housing top 12a.

Figure 8A:
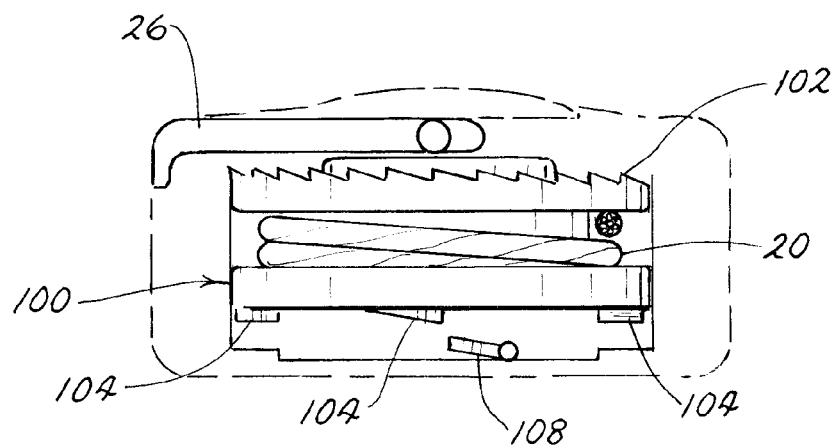
FIG. 8A is a partial, schematic view of the tensioning device 11 of FIG. 1 showing the internal components when the lever 26 is in a down or disengaged position and the ratchet spool 100 is in an up or engaged position within the housing, which is shown in phantom, but without showing the wave spring(s) to permit clarity.
Figure 8B:
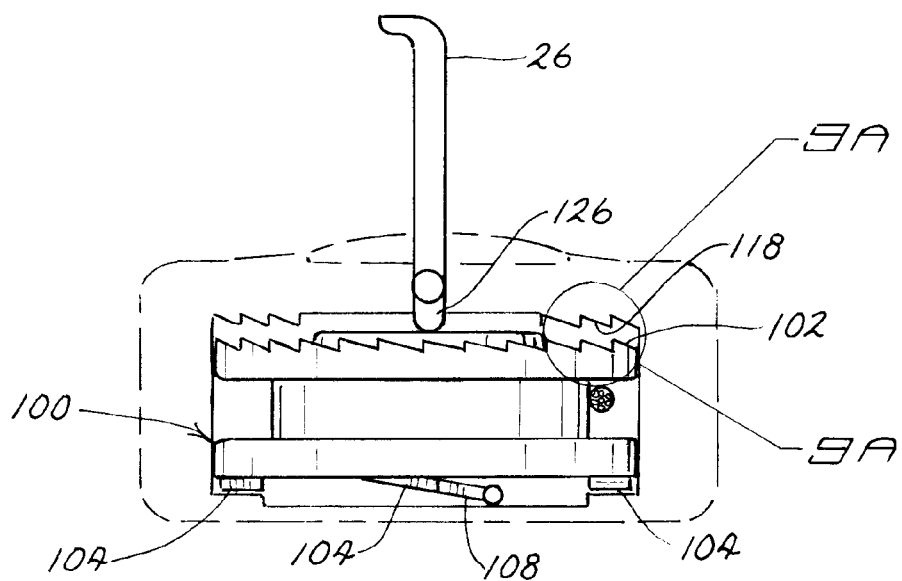
FIG. 8B is a partial, schematic view of the tensioning device 11 shown in FIG. 1, similar to that shown in FIG. 8A, but showing the tensioning device 11 when the lever 26 is in an up position and the ratchet spool 100 is in a down position.
Figure 9A:
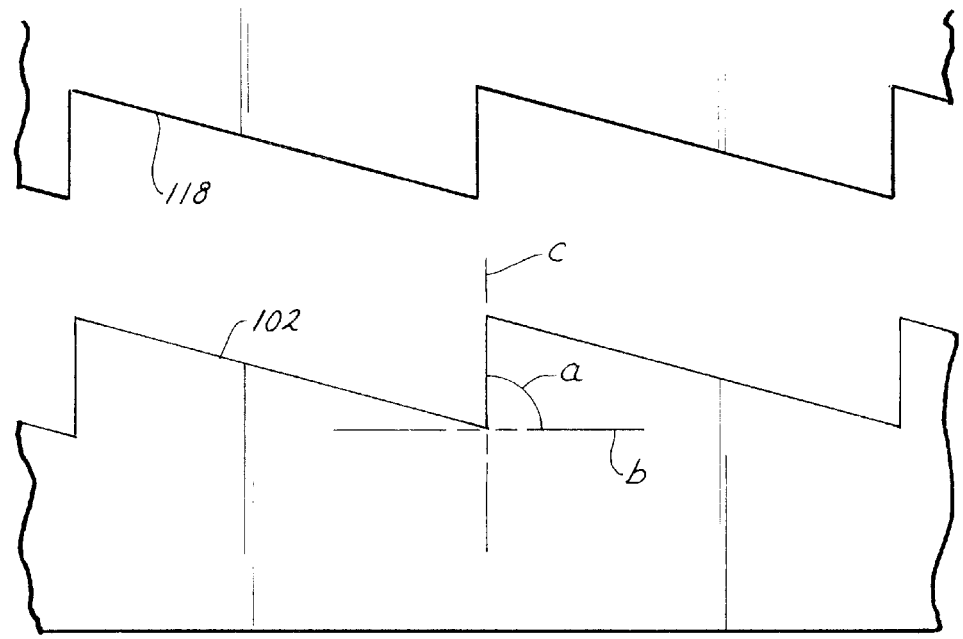
FIG. 9A is an enlarged, partial, schematic view of a portion of tensioning device 11 shown in area 9a-9a of FIG. 8B illustrating the ratchet teeth 102 and housing teeth 118 cut at an angle "a" of about 90 degrees to a horizontal plane "b" perpendicular to a vertical axis "c" of the ratchet spool and the housing.
Figure 9B:
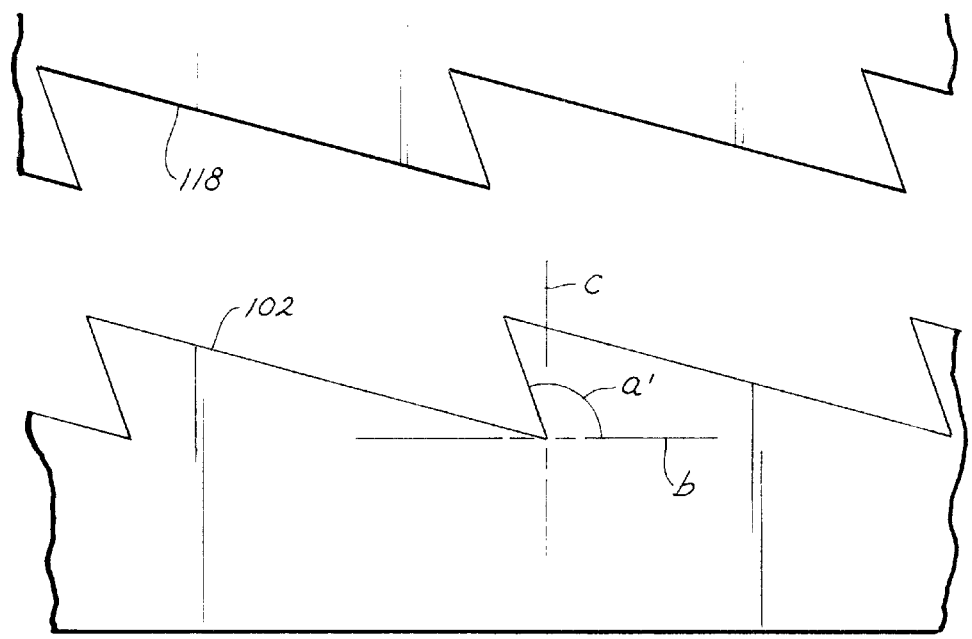
FIG. 9B is an enlarged, partial, schematic view similar to that shown in FIG. 9A, but illustrating a preferred embodiment, wherein the ratchet and housing teeth 102, 118 are undercut about 20 degrees more than a 90 degree angle to a horizontal plane "b" perpendicular to a vertical axis "c" of the ratchet spool and the housing.

In FIG. 3, there is illustrated an exploded view of one embodiment of the tensioning device 11 of the present invention. A wave spring 112 sits on the inside of the housing bottom 12b. The wave spring 112 is positioned in a way to apply pressure to the ratchet spool 100. The tension spring 110 also rests inside the ratchet spool 100 and has a crimp 122 that mates with a notch 120 in the ratchet spool 100 to secure the tension spring 110 to the ratchet spool 100. The tension spring 110 is also connected to a column 213 of the housing bottom 212b so as to provide tension to the ratchet spool 100. The ratchet spool 100 has a center channel 124 running circumferentially around its exterior and is sufficiently wide and deep enough for a cord 20 to be wound within the channel 124 around the ratchet spool 100. In this embodiment, the under surface 132 of the ratchet spool 100 has four catches 104. It is not essential that there be four catches 104 as two to six catches 104 will result in similar function. More than six catches 104 is possible but not recommended. As better shown in FIGS. 8A-8B, the catches 104 prevent the ratchet spool 100 from rotating in the wind-up direction when they are blocked by the stopper 108. The catches 104 can only be blocked by the stopper 108 when the ratchet spool 100 is in the down position (when the cam 126 is in the down position/the actuating lever 26 is in the up position). On the top of the ratchet spool 100 are ratchet teeth 102. As seen in FIGS. 8A and 8B, the ratchet teeth 102 can engage with the housing teeth 118 located in the housing top 12a when the actuating lever 26 is oriented in the down position. When the actuating lever 26 is in the down position, a cam 126, which extends from the actuating lever 26, is parallel to the plane of rotation of the ratchet spool 100. Therefore, there is no added pressure on the wave spring 112, which allows the wave spring 112 to push the ratchet spool 100 to its up position, engaging the ratchet spool 100 with the housing teeth 118. When the actuating lever 26 is in the up position/the cam 126 is in a down position and pushes the top base 114 down against the ratchet teeth 102, which are subsequently pushed down thereby disengaging the ratchet teeth 102 from the housing teeth 118. The top 116 has slots 117 for the cam levers 26 to rotate. The housing teeth 118 are molded into the housing top 12a.

Figure 4:
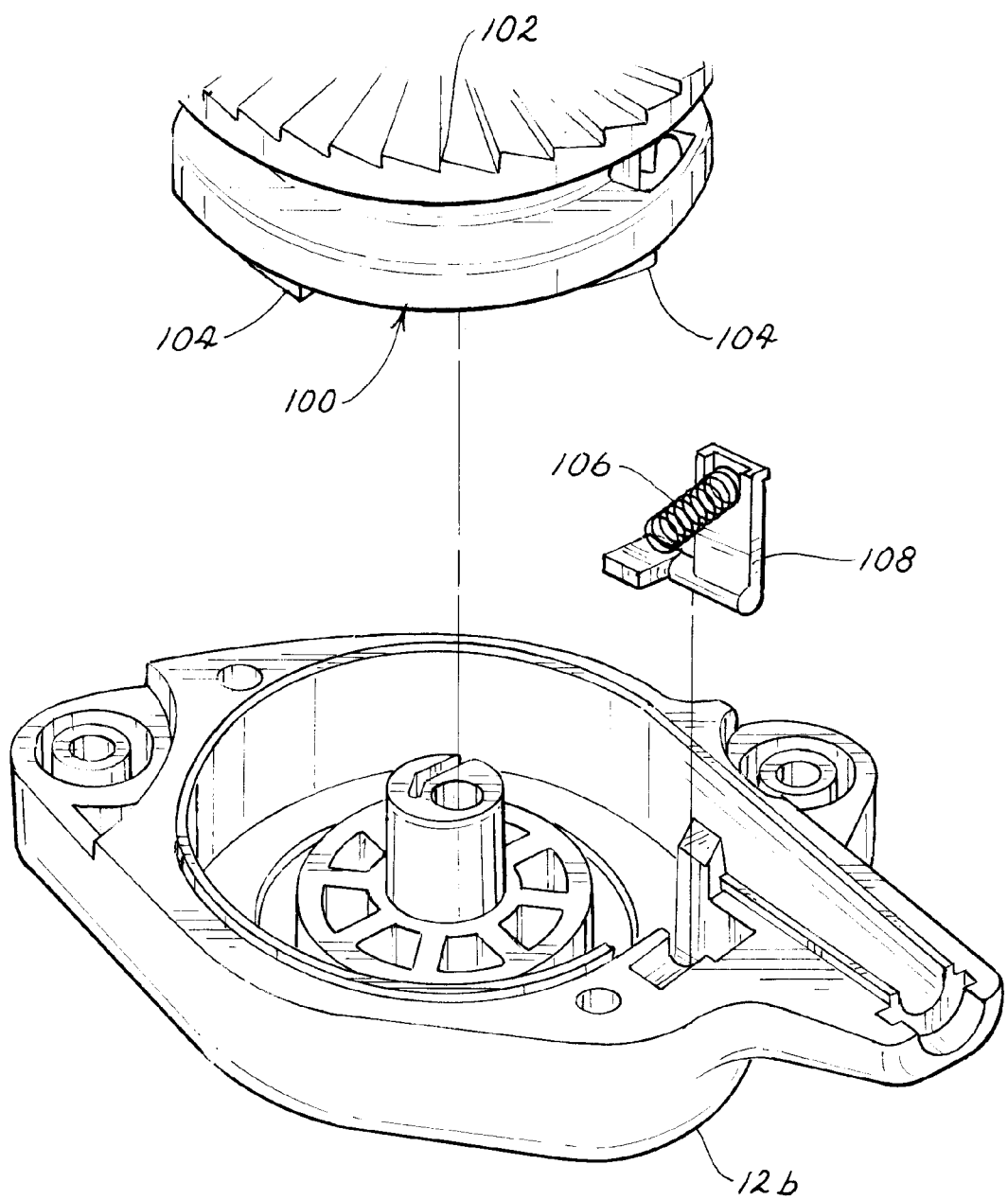
FIG. 4 is an exploded, partial, schematic view of certain components of the tensioning device 11 of FIGS. 1-3 illustrating the location of the ratchet spool 100, a compression spring 106 and a stopper 108 within a housing bottom 12b of the tensioning device.
Figure 5:
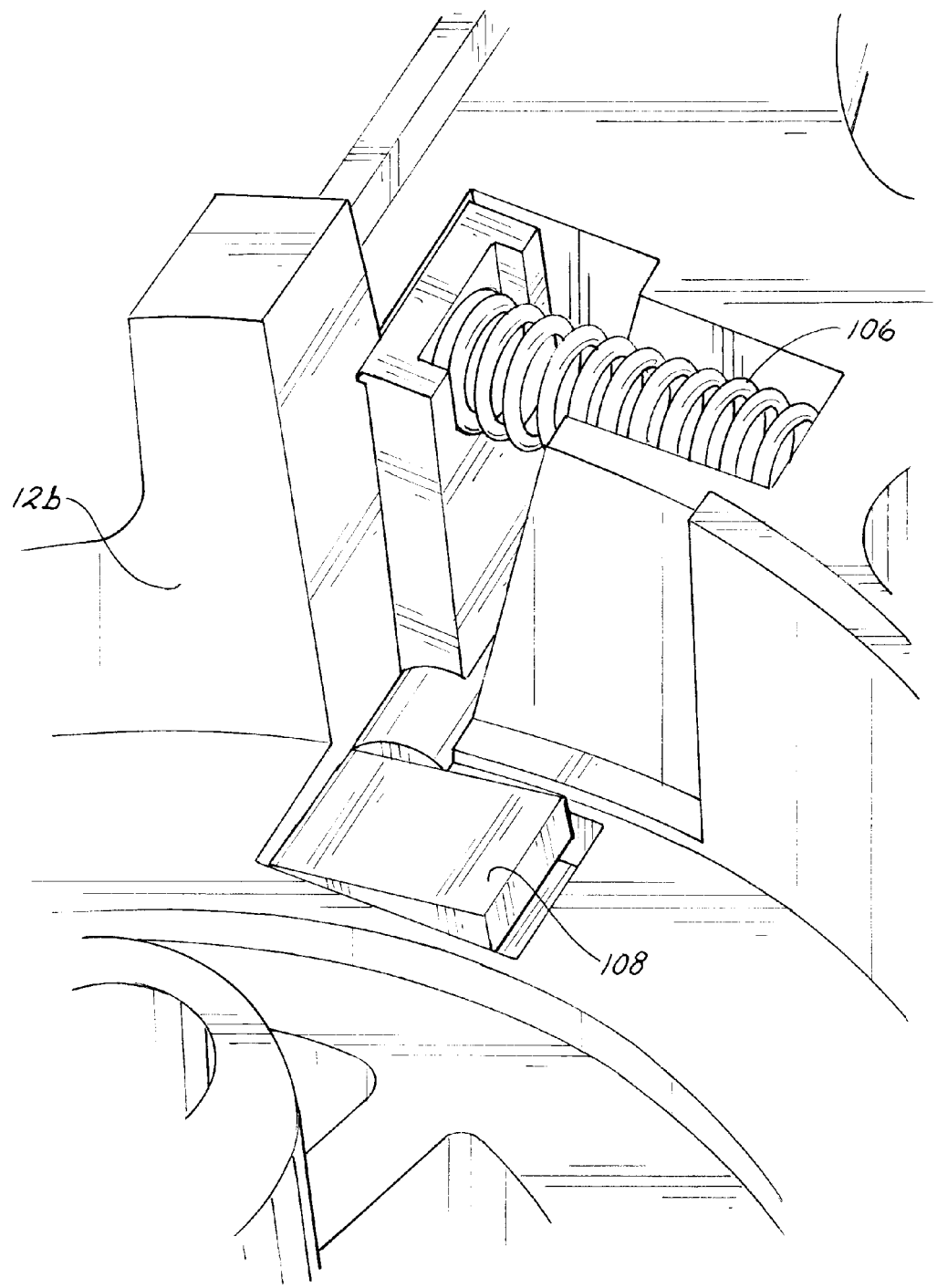
FIG. 5 is a partial perspective view of the stopper 108 and compression spring 106 of FIG. 4 fitted in the housing bottom 12b of the tensioning device 11 of FIG. 4.

The stopper 108 has an up position and a down position. Referring now also to FIGS. 4 and 5, showing the arrangement of the catches 104, the compression spring 106 and stopper 108 in the up position. The compression spring 106 is attached to the stopper 108 and they both are placed in the housing bottom 12b such that the compression spring 106 applies force to the housing bottom 12. The compression spring 106 places a bias on the stopper 108 such that the stopper 108 will block a catch 104 should the ratchet spool 100 be in the down position and rotating in the wind-up direction so that the ratchet spool will not rotate more than 360 degrees in the wind-up direction when the ratchet spool 100 is in a down position. One preferred tensioning device 10 includes a housing 12 having a stop and a set of housing teeth; a winding mechanism including a spool 100 having set of ratchet teeth 102 and at least one catch 104, the winding mechanism located within the housing 12; and a cord 20 operatively connected to the spool 100; wherein the winding mechanism has two positions that control the movement of the cord 20, the first position being a wind-up position where the cord is pulled into the housing and cannot be pulled outwardly from the housing, the second position being a wind-out position wherein the cord may be pulled outwardly from the housing. In this preferred embodiment, if the cord 20 is pulled outwardly from the housing 12 and then released, while the winding mechanism is in the second position, the cord will retract into the housing until the catch 104 contacts the stop or stopper 108 such that the spool 100 will rotate less than 360 degrees before the catch contacts the stop and the stop is spring biased such that the stop will block one of the at least one catches when the ratchet teeth are disengaged with the housing teeth and the spool is rotating in a wind-up direction.

Figure 6:
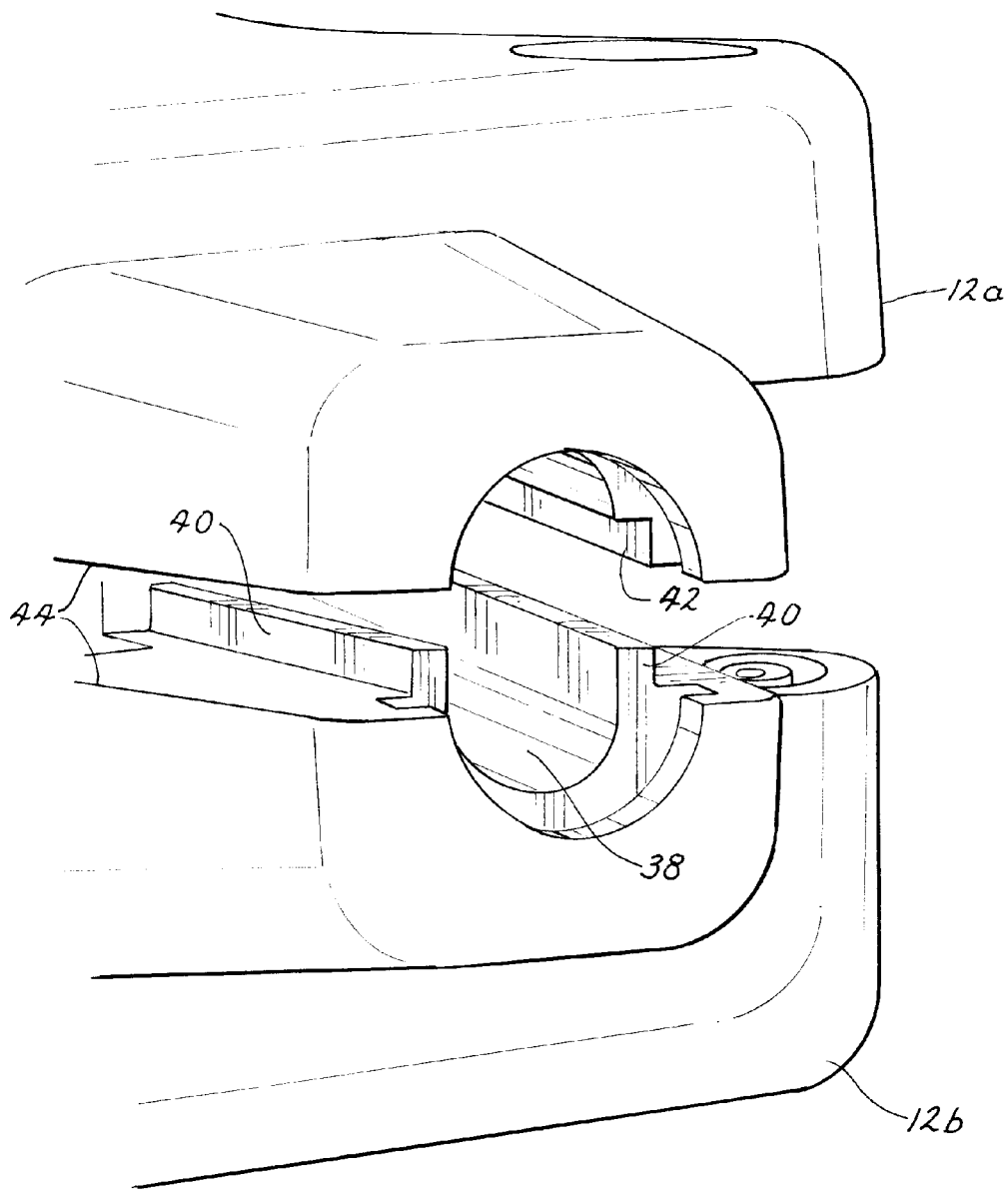
FIG. 6 is a partial perspective view of a portion of the housing of the tensioning device of FIGS. 1-5 illustrating elements 40, 42 of a housing lip and groove joint.

Now also referring to FIG. 6 showing the lip 40 and groove 42 configuration near the aperture 38 defined by the housing 12. The lip 40 and groove 42 mate to form a housing joint 44 resistant to dirt, debris and moisture. The present invention further includes a method of attaching two housing pieces of a tensioning device for use with a self-tensioning snow chain, wherein the method comprises the steps of providing a first and second housing piece 12a, 12b. One respective housing piece 12b has a lip 40 and the other respective housing piece 12a has a groove 42 such that the lip can be mated with the groove within a joint between the top and the bottom 12a, 12b of the housing 12.

Figure 7A:
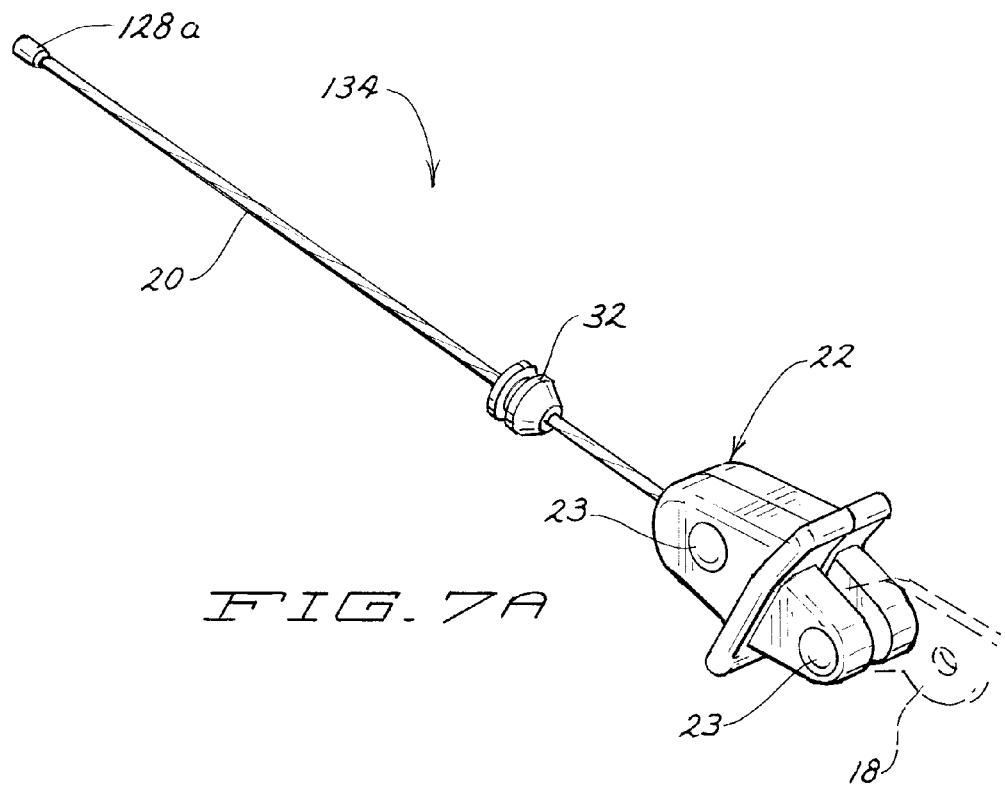
FIG. 7A is a perspective view of a tensioning cord sub-unit 134 of the tensioning device 11 of FIGS. 1-6 and showing the hook 18, to which the connector 22 is secured, in phantom.
Figure 7B:
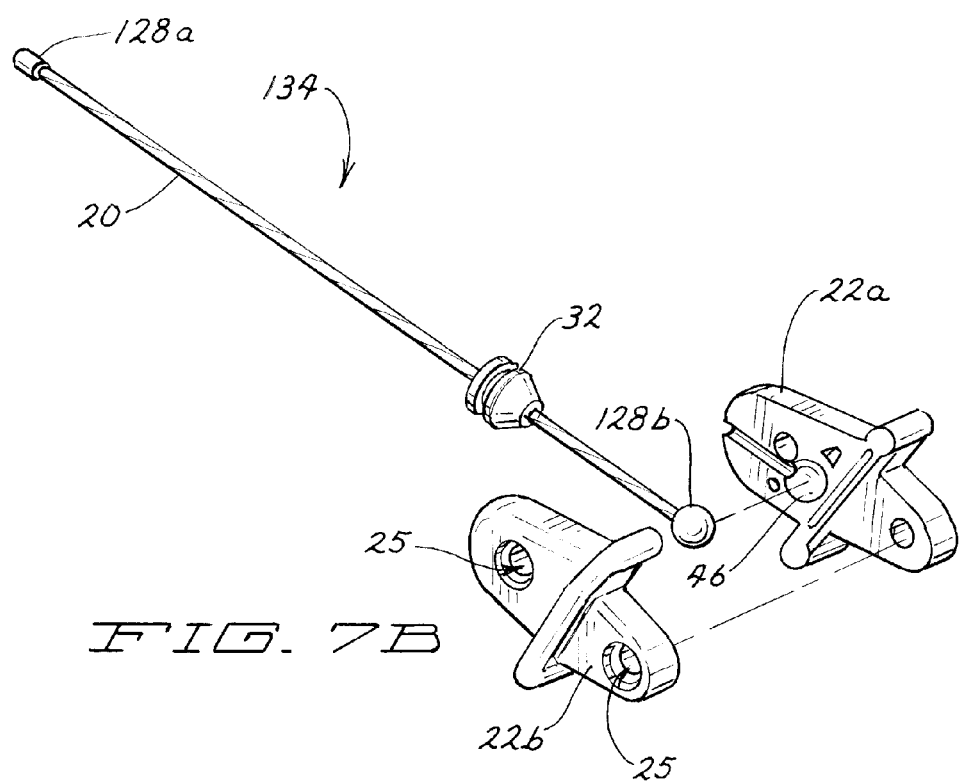
FIG. 7B is a perspective view of components of the tensioning cord sub-unit 134 shown in FIG. 7A, before it is completely assembled.

Now also referring to FIGS. 7A and 7B showing an assembled tensioning cord sub-unit 134. A cord 20 is threaded through a grommet 32 and has a first knob 128a and a second knob 128b. The knobs 128 may be fitted to the cord 20 by crimping, melting, casting and the like. The cord 20 is threaded through the grommet 32 before both of the knobs 128 are fitted to the cord 20, which permits the diameter of the grommet 32 to be smaller than the diameter of the knobs 128, so that the grommet 32 may more closely fit the cord 20, allowing the grommet to be more appropriately sized to limit the infiltration of dirt, debris and moisture into the housing 12. The cord 20 is attached to the first connection member 22 that is connected to a hook 18 (shown in phantom) used for securing the tensioning device 11 to parts of the snow chain 14. FIG. 7B shows how the second knob 128b fits into a recess 46 (partially shown) formed by a first piece 22a and second piece 22b of the first connection member 22. The first and second pieces 22a and 22b are secured together around the second knob 128b that is tightly secured to the cord 20. Rivets 23 are placed through rivet receiving openings 25 to secure first and second pieces 22a and 22b together, although any other fasteners such as threaded screws, bolts and nuts, adhesives, double backed tape and the like could be used.

Referring now also to FIGS. 8A and 8B, FIG. 8A is a sectional view showing the internal components when the actuating lever 26 is in the down position thereby allowing the ratchet spool 100 to be in the up position. When the ratchet spool 100 is in the up position, the catches 104 are clear of the stopper 108 thereby allowing the ratchet spool 100 to freely wind-up and tighten the cord 20. In this mode, the ratchet spool 100 may only rotate in the wind-up direction, because the ratchet teeth 102 can fully engaged with the housing teeth 118 to limit rotation if an extending or wind-out force is applied to the cord 20.

FIG. 8B is a sectional view showing the internal components when the actuating lever 26 is in the up position thereby forcing the ratchet spool 100 to be in the down position. While the ratchet spool 100 is in the down position, the ratchet teeth 102 are disengaged from the housing teeth 118. This allows the ratchet spool 100 to rotate freely in either direction. The catches 104 stop the ratchet spool 100 from fully rotating in the wind-up direction. As the ratchet spool 100 begins to rotate in the wind-up direction, the stopper 108 will block the next catch 104 it encounters, thereby preventing the ratchet spool 100 from further winding-up.

In the embodiment shown in FIGS. 8A through 9A, the ratchet teeth 102 and the housing teeth 118 are cut at an angle "a" of about 90 degrees to a horizontal plane perpendicular to a vertical axis of the ratchet spool and the housing. In alternate embodiments of the present invention, the ratchet teeth 102 and housing teeth 118 may be overcut or undercut. The teeth 102, 118 may be undercut at an angle ranging from about 3 to about 30 degrees, preferably from about 10 to about 25 degrees more than a 90 degree angle to a horizontal plane "b" perpendicular to a vertical axis "c" of the ratchet spool and the housing, so that when the tensioning device 11 is in a wind-up mode and the cord is tugged outwardly, the more the ratchet teeth 102 will become engaged and resist the cord 20 being moved in the wind-out direction. In the most preferred embodiments, the teeth 102, 118 are undercut at an angle "a'" of about 20 degrees more than a 90 degree angle to a horizontal plane "b" perpendicular to a vertical axis "c" of the ratchet spool and the housing, as illustrated in FIG. 9B.

Figure 10A:
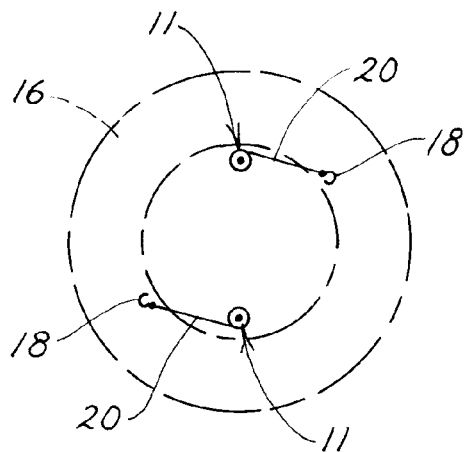
FIG. 10A is a diagrammatic view of the positioning of the tensioning devices 11 of the present invention showing a preferred positioning on a wheel 16 (shown in phantom) of two, single-cord tensioning devices 11 similar to the one shown in FIG. 1.

Now referring also to FIG. 10A, FIG. 10A is a diagrammatic view of one embodiment of the present invention showing the preferred positioning of two, single tensioning devices 11 attached to a wheel 16. In this embodiment, the tensioning devices 11 are approximately 180 degrees from each other and their respective cords 20 and hooks 18 extend in opposite directions.

Figure 10B:
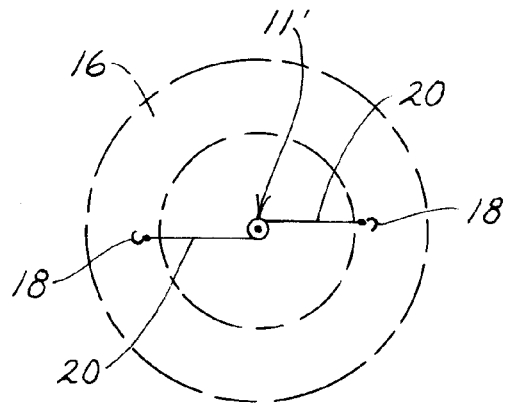
FIG. 10B is a diagrammatic view of the positioning of an alternate tensioning device 11' of the present invention showing a preferred positioning of a single, dual cord tensioning device 11' that tightens two tensioning cords 20 with respect to a snow cable (not shown) on a wheel 16 (shown in phantom)
Figure 10C:
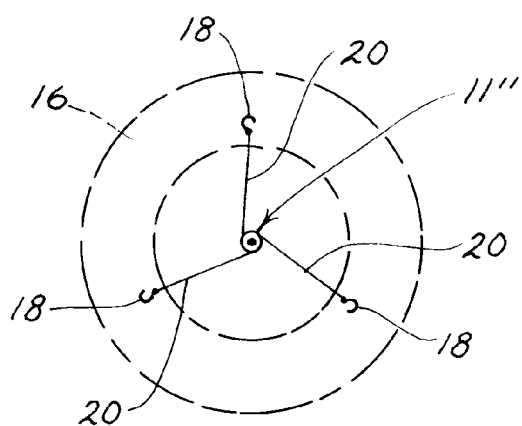
FIG. 10C is a diagrammatic view of one the positioning of an alternate tensioning device 11" of the present invention showing a preferred positioning of a single, multiple cord tensioning device 11" that tightens three tensioning cords 20 with respect to a snow cable (not shown) on a wheel 16 (shown in phantom)

Referring now also to FIGS. 10B and 10C, FIG. 10B is a diagrammatic view of one embodiment of the present invention showing the preferred positioning of a single, tensioning device 11' attached to a first cord 20 and a second cord 20a that each have their respective hooks 18. In this embodiment, the tensioning device 11' is centered with the exterior of the wheel 16 to provide equal tension on the first cord 20a and the second cord 20b which extend parallel to each other.

FIG. 10C is a diagrammatic view of one embodiment of the present invention showing the preferred positioning of a single, tensioning device 11" attached to a first cord 20, a second cord 20b, and a third cord 20c that each have their respective hooks 18. The tensioning device 11" is centered with the exterior of the wheel 16 to provide equal tension on the first cord 20a, the second cord 20b, and the third cord 20c, which extend approximately 120 degrees from each other.

Figure 11A:
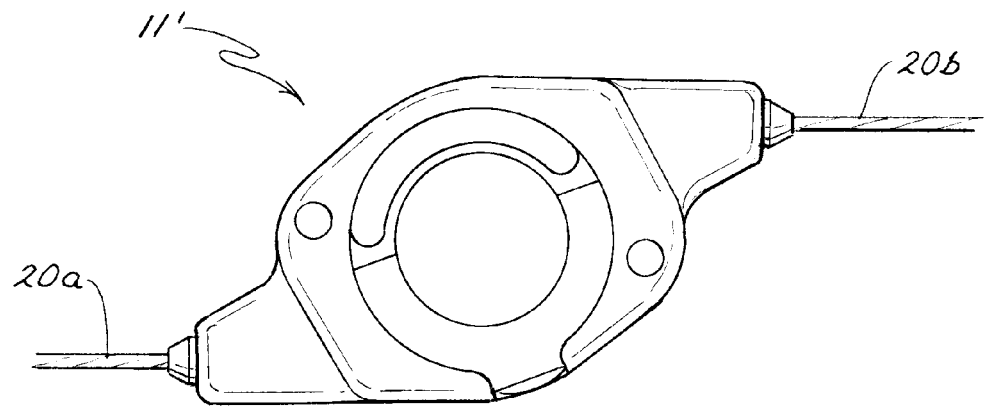
FIG. 11A is a plan view of a dual cord tensioning device 11', similar to the tensioning device 11 shown in FIG. 1, but where the tensioning device 11' includes two cords 20a, 20b.
Figure 11B:
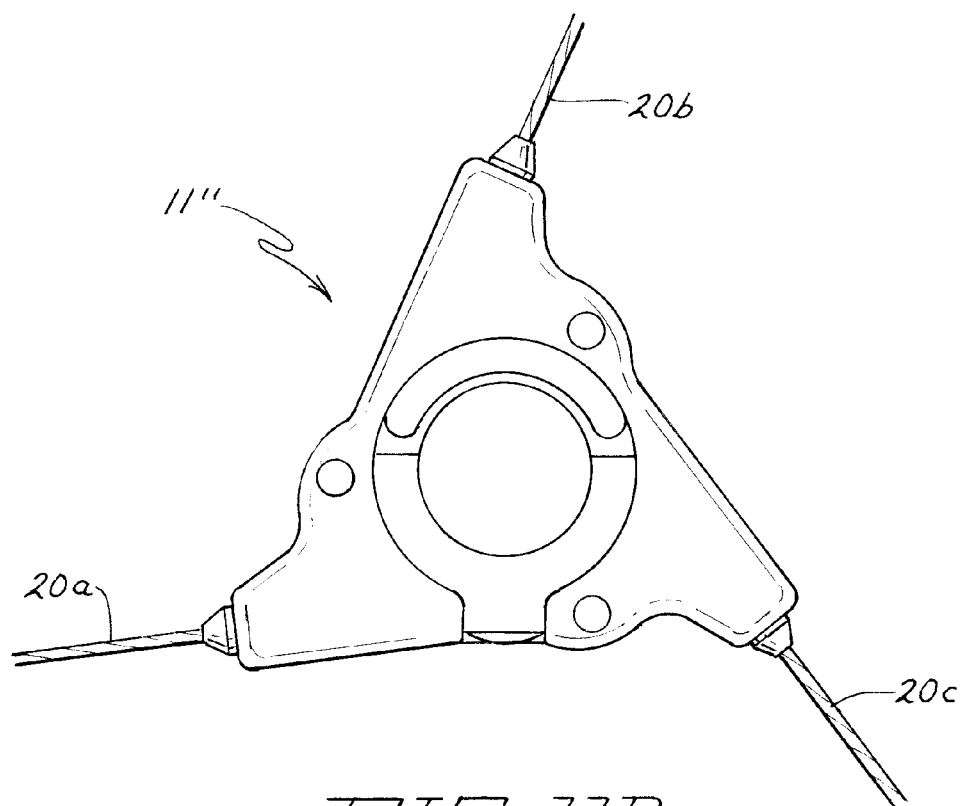
FIG. 11B is a plan view of a triple cord tensioning device 11", similar to the tensioning device 11 shown in FIG. 1, but where the tensioning device 11" includes three cords 20a, 20b, 20c.

Now referring also to FIG. 11A that shows another embodiment of the tensioning device of the present invention wherein the tensioning device 11' tensions a first cord 20a and a second cord 20b. Referring now also to FIG. 11B, which shows another embodiment of the tensioning device 11' of the present invention, wherein the tensioning device 11" applies tension to a first cord 20a, a second cord 20b and a third cord 20c.

Figure 12A:
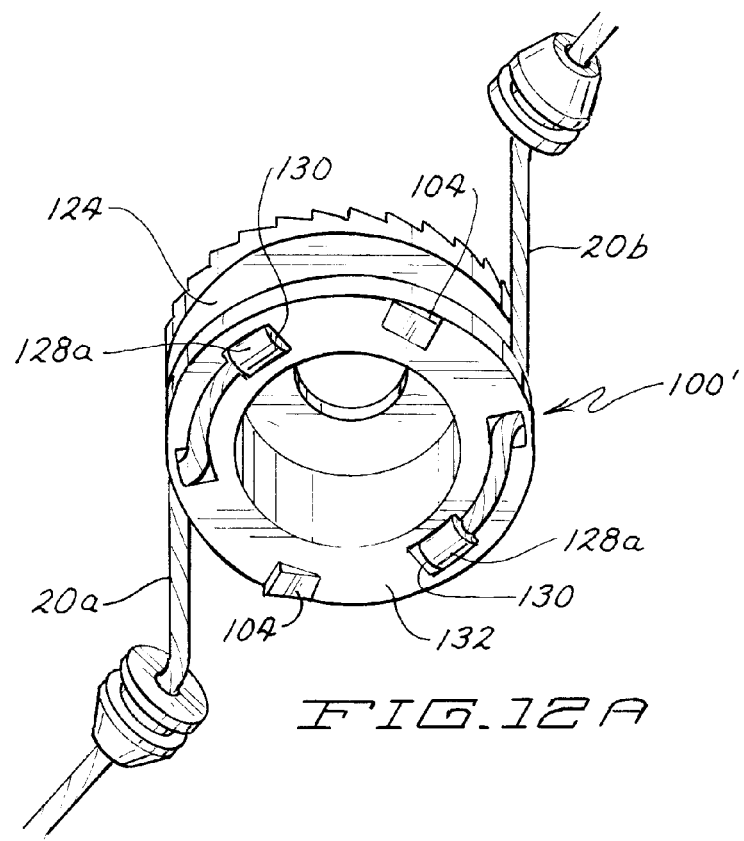

Now referring also to FIG. 12A, FIG. 12A is a perspective view of one embodiment an alternate ratchet spool 100' of the present invention showing the ratchet spool 100' configuration of having a first cord 20a and a second cord 20b that are attached to the ratchet spool 100' and wound in the channel 124. In this embodiment, only two catches 104 are on the under surface 132 of the ratchet spool 100', because less space is available. The first cord 20a and second cord 20b have a first knob 128a fitted to their respective ends sized to fit snuggly into the ratchet spool recess 130 to prevent the first cord 20a and the second cord 20b from being pulled off of the ratchet spool 100'.

Figure 12B:
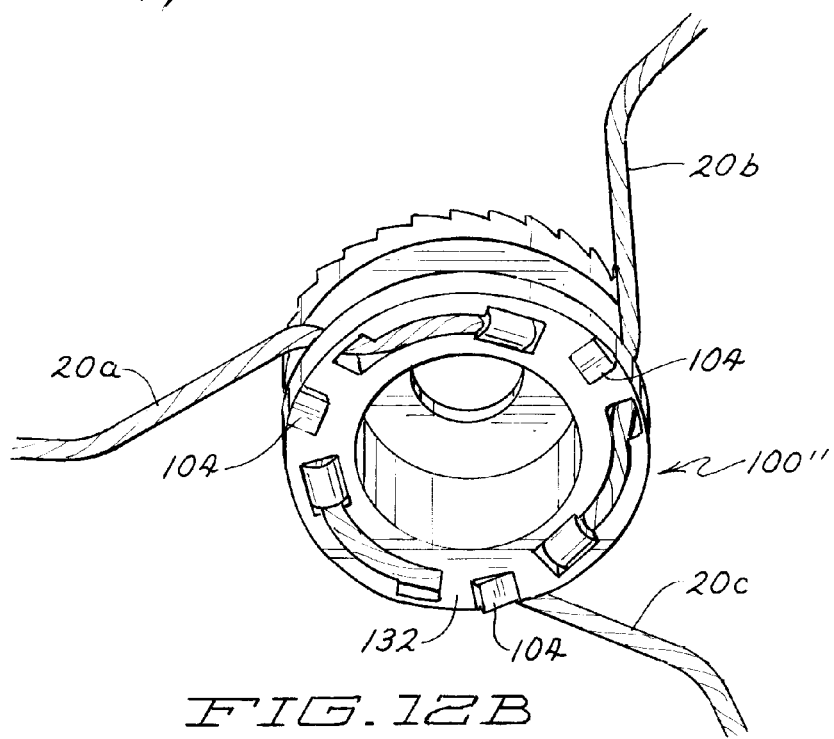

Referring now also to FIG. 12B, FIG. 12B shows a perspective view of an embodiment of the present invention showing a further alternate ratchet spool 100" configuration having a first cord 20a, a second cord 20b, and a third cord 20c.

Figure 22:
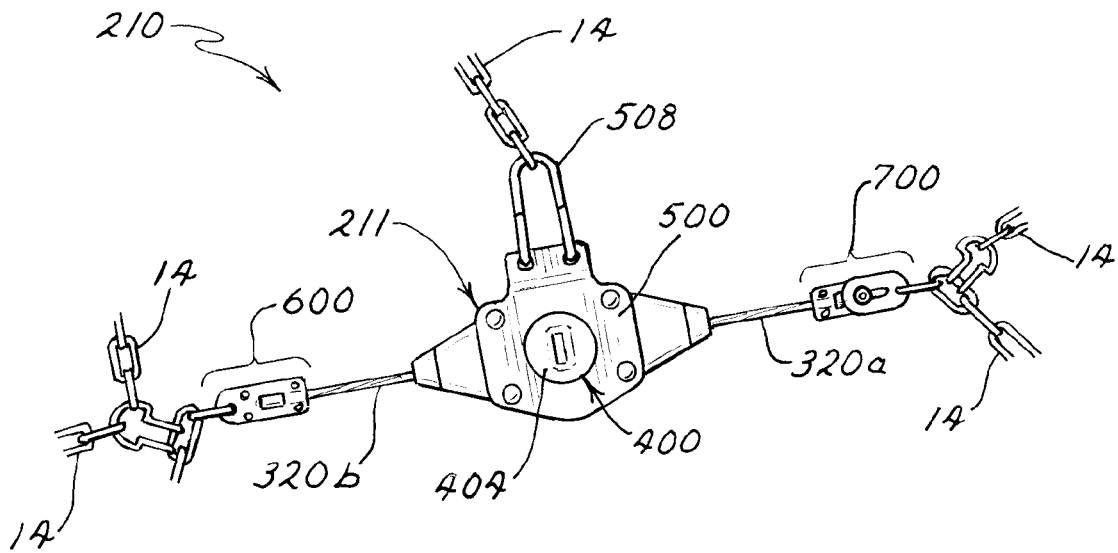
FIG. 22 is a partial, plan view of the tensioning device of FIG. 17 connected to a snow chain with a first attachment device, a second attachment device and a cross chain attachment link.
Figure 23:
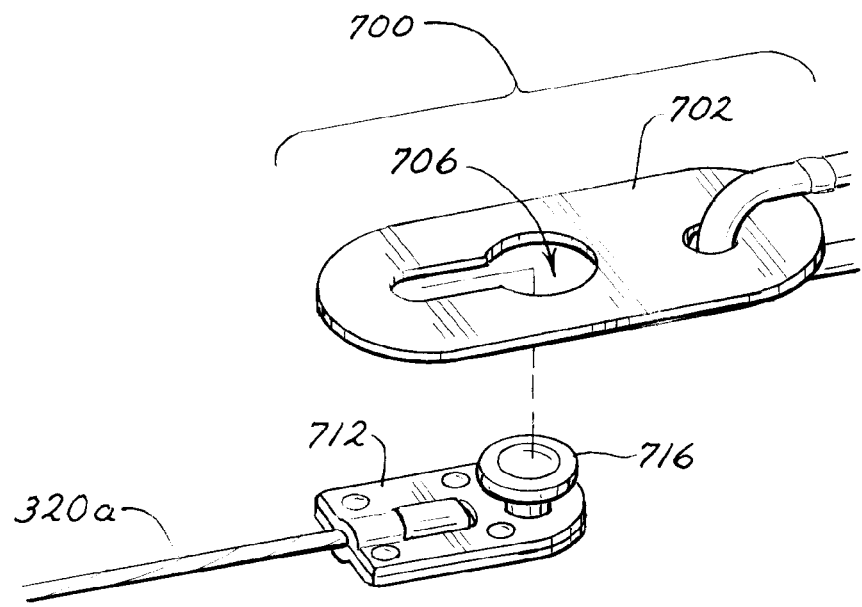
FIG. 23 is a partial, exploded view of the second attachment device.

In embodiments have multiple cords to be tensioned, some of the cords may be fixedly attached to the snow chain using any known attachment device. Two such attachment devices 600, 700 are illustrated in FIGS. 17 and 22-23. It will be understood that many various attachment devices for fixedly attaching one cord to the snow chain may be used and are within the scope of the present invention.

Referring now to FIGS. 13-16B, there is illustrated an alternate tensioning device 11''' having a housing 12''' having a housing top 12a''' and a housing bottom 12b'''. There are holes 29 where rivets (not shown) will be inserted to attach the housing top 12a''' and the housing bottom 12b''' as in the other embodiments of the tensioning device. Located on the housing top 12a''' is a top button 138. Additionally, on the side of the housing 12''' are a first side button 136a and a second mirroring side button 136b (not shown). Protruding from the housing 12''' is a grommet 32 from which a cord 20 (not shown) may pass.

Figure 13:
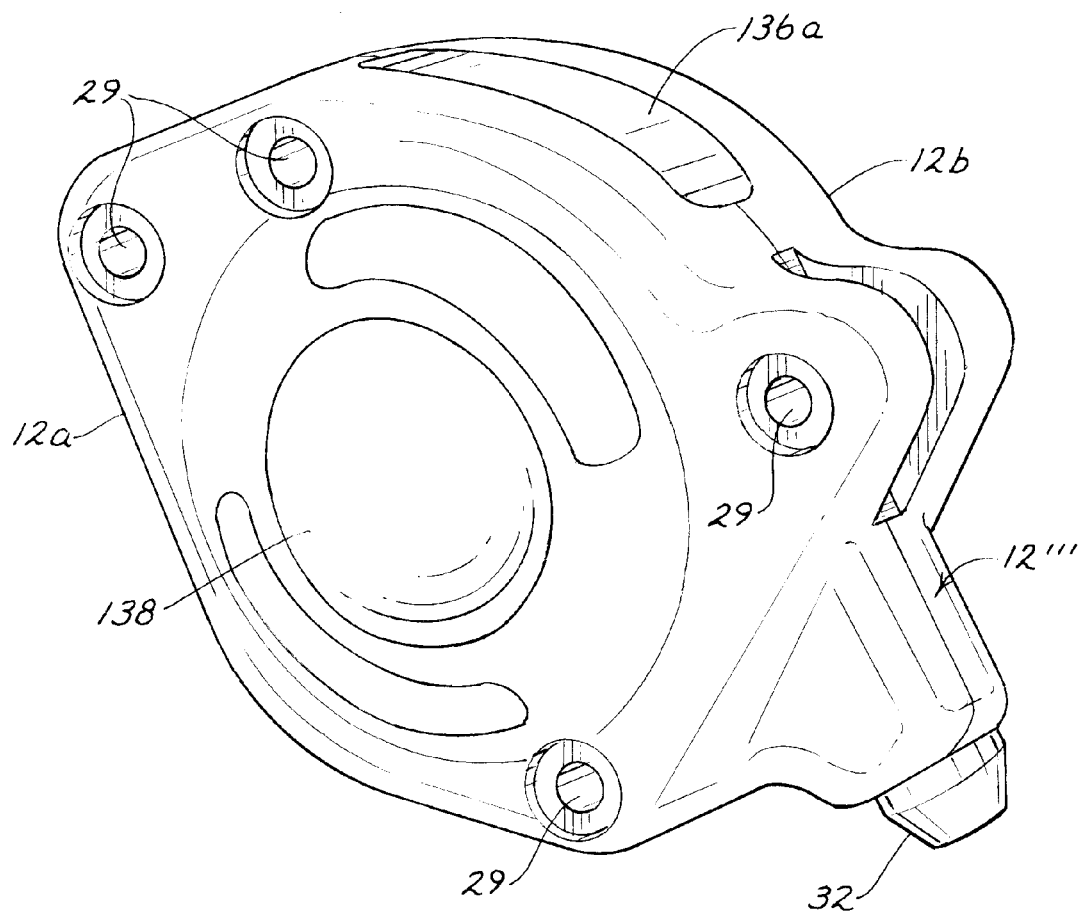
FIG. 13 is a perspective view of the housing 12''' of an alternate embodiment of a single cord tensioning device; wherein buttons 136b are used to actuate or change tensioning device modes.
Figure 14:
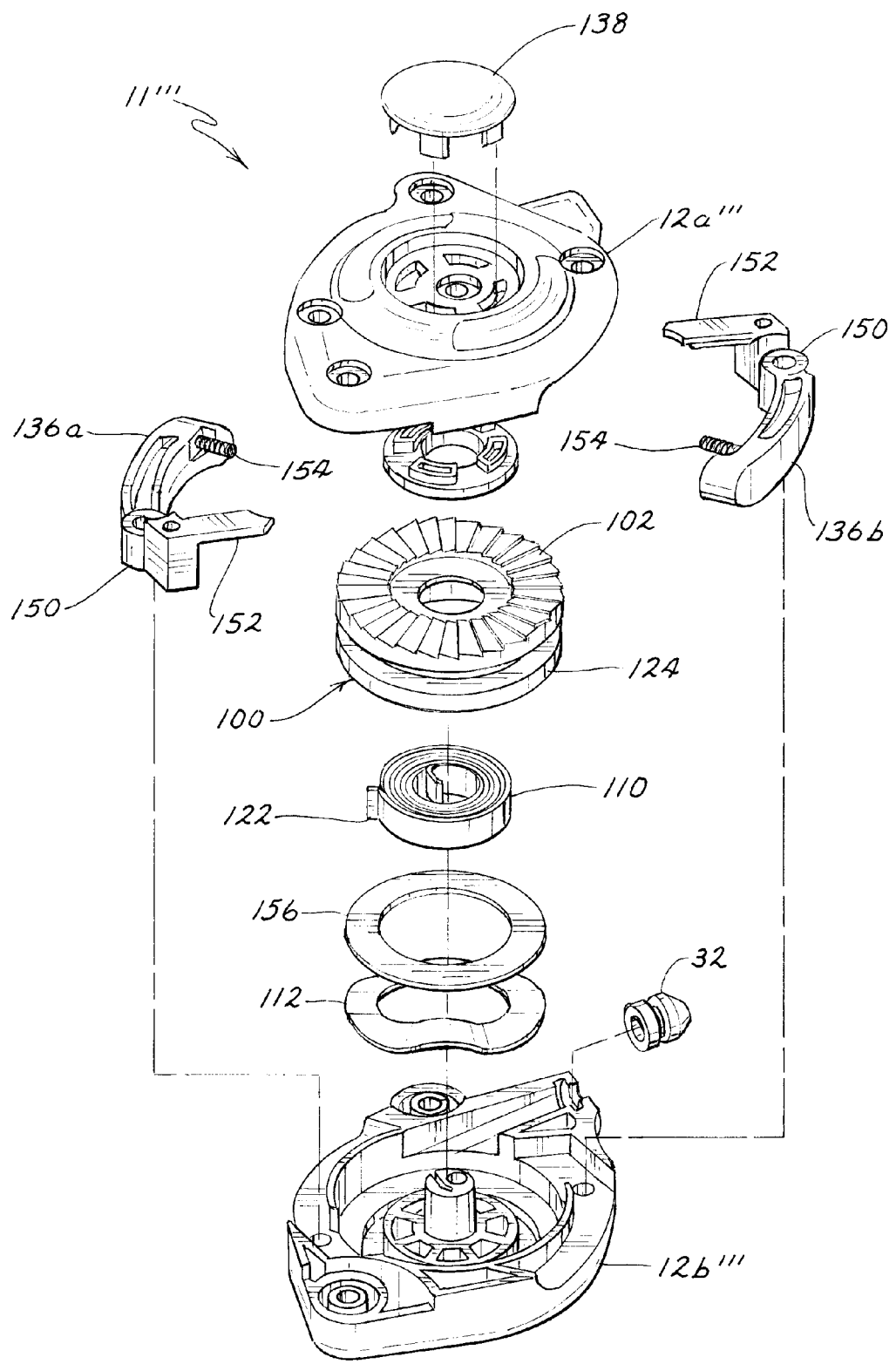
FIG. 14 is an exploded view of an alternate single cord tensioning device 11''' having a housing 12''' like that shown in FIG. 13, but not including a tensioning cord sub-unit.
Figure 16A:
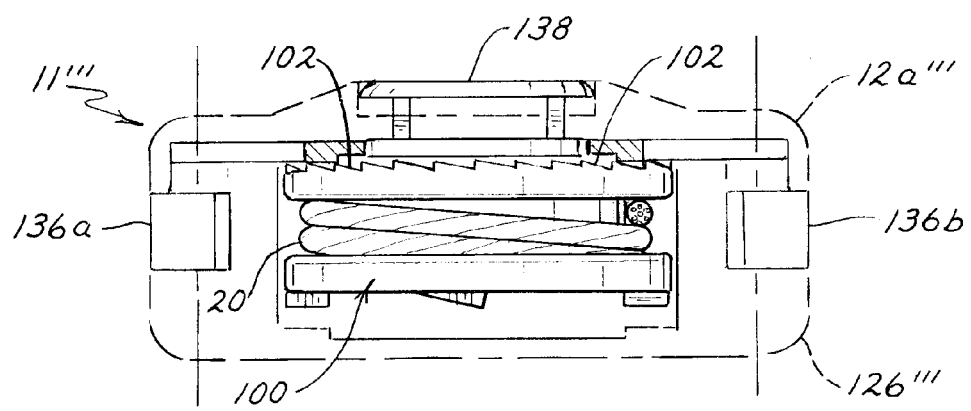
FIG. 16A is a sectional view, similar to that shown in FIG. 8A, but showing the alternate tensioning device 11''' of FIG. 13, showing the internal components when the top button 138 is in the up position and the ratchet spool 100 is in the up position (wave spring(s) not shown for clarity)
Figure 16B:
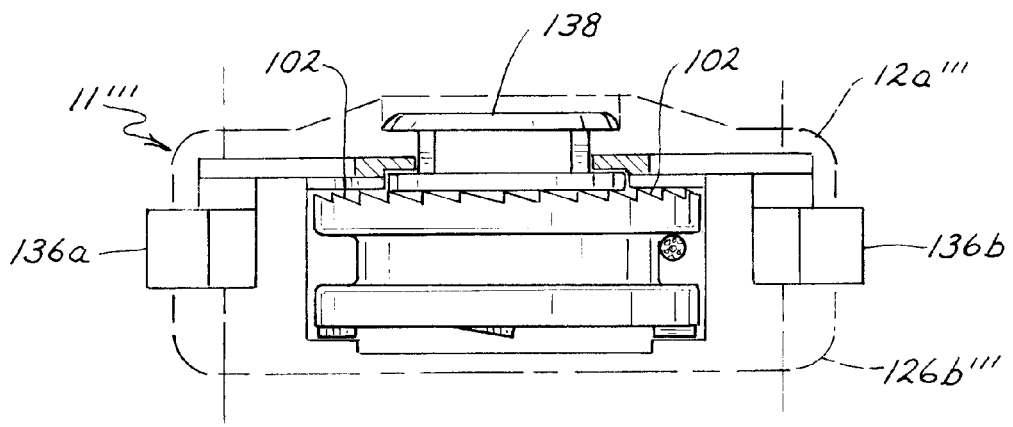
FIG. 16B is a sectional view, similar to that shown in FIG. 8B, but showing the alternate tensioning device 11''' of FIG. 13, showing the internal components when the top button 138 is in the down position and the ratchet spool 100 is in the down position (wave spring(s) not shown for clarity).

FIG. 14 shows an exploded view of the tensioning device 11''' shown in FIG. 13, but without the tensioning cord subunit 134. A wave spring 112 sits on the inside of the housing bottom 12b''' and is positioned in a way to apply pressure to the ratchet spool 100. A washer 156 is placed in between the wave spring 112 and the ratchet spool 100. The tension spring 110 also rests inside the ratchet spool 100 and has a crimp 122 that can be inserted into a notch 120 (not shown) in the ratchet spool 100, similar to that shown in FIG. 3, to secure the tension spring 110 to the ratchet spool 100. The ratchet spool 100 has a channel 124 running around the outside of the ratchet spool 100 in the center and is sufficiently wide and deep enough for a cord 20 (not shown) to be wound around the rachet spool 100 within the channel 124. On the top of the ratchet spool 100 are ratchet teeth 102. The ratchet teeth 102 engage with the housing teeth 118 (not shown). In addition, there is a pawl 152, connected to each of the side buttons 136, having a pivot point 150. The side buttons 136 are spring loaded with a pawl spring 154. As seen in FIG. 16A and 16B, the ratchet teeth 102 engage with the housing teeth 118 (not shown) located in the housing top 12a''' when the top button 138 is in the up position. When the top button 138 is in the up position, the ratchet spool 100 may can only move in the wind-in direction to tighten the cord 20 (not shown). In this mode, the side buttons 136 are pushed into the housing 12'''. When the top button 138 is in the down position, the ratchet spool 100 may move in either the wind-in or the wind-out direction. In this mode, the side buttons 136 are pushed out of the housing 12''' by the force of the spring 154.

Figure 15:
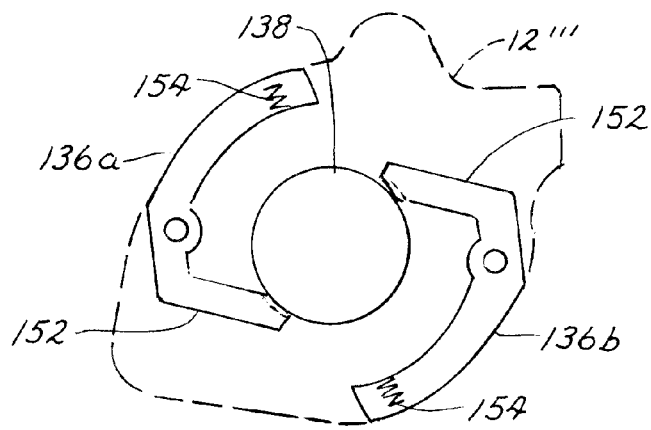
FIG. 15 is a diagrammatic view of the tensioning device 11''' of FIGS. 13 and 14, showing the pivot and contact points of the pawls 152 and top button 138.

Referring now also to FIG. 15, showing the positioning of the top button 138 and the side buttons 136 when the top button 138 is in the up position. Here, the side buttons 136 are pushed into the housing 12'''. Two button springs 154 rest against the interior of the housing top 12a''' and apply pressure to move the side buttons 136 out of the housing 12'''. However, the side buttons 136 do not move out of the housing because the pawls 152 are stopped by the top button 138. When the top button bottom 138 is pushed down, the pawls 152 are no longer blocked and the side buttons 136 will pop out of the housing 12'''. When housing teeth 118 are not in contact with the ratchet teeth 102 (not shown), the ratchet spool 100 (not shown) may rotate freely.

Referring now also to FIGS. 16A and 16B, FIG. 16A, shows the arrangement of the side buttons 136, the top button 138, the ratchet teeth 102, and the housing teeth 118 when the top button 138 is in the up position. When the top button 152 is in the up position, the pawls 152 engage with the ratchet teeth 102 and the ratchet spool 100 may only move in the wind-up direction. In this view, for clarity, the wave spring 112 is not shown.

Referring now also to FIG. 16B, illustrating the arrangement of the top button 152, the ratchet teeth 102, and the housing teeth 118 when the top button 138 is in the down position. As the top button 138 gets pushed into to the down position, the force created by the button springs 154 (see FIGS. 14 and 15) snaps the pawls 152 away from the ratchet teeth 118 so that the ratchet spool 100 can move in the wind-in or wind-out direction. To switch modes and prevent the ratchet spool 100 from rotating in the wind-out direction, the user presses the side buttons 136 back into the housing 12''' to force the top button 138 back up and allow the pawls 152 to again come into contact with the ratchet teeth 118. In this view, for clarity, the wave spring 112 is not shown.

FIGS. 17-22 illustrate an alternative self-tensioning snow chain 210 having an alternate tensioning device 211. Tensioning device 211 is similar to and operates in a manner similar to the manner in which tensioning devices 11, 11', 11'', shown in FIGS. 1-16B, operate, at least with respect to the many of the common components thereof. A new, and in some ways, preferable actuation system has been developed that has preferred capability in commercial markets where durability and strength are demanded. Tensioning device 211 includes a housing 212 having a housing top 212a, a housing bottom 212b and a ratchet spool 300 generally contained within the housing 212. The ratchet spool 300 of this preferred embodiment has two tensioning cords 320a, 320b having ends secured or anchored within central channel 324 of the ratchet spool 300, preferably at different locations, and then extending outwardly from the tensioning device 211 at approximately 180 degrees with respect to one another. The tensioning device 211 further includes an actuator 400 to shift the ratchet spool 300 between the respective up and down positions. In this embodiment, the actuator 400 includes a cam disc 402 and a rotation disc or key disc 404 that inter-engage each other. The actuator can be operated with a key K. As with previous embodiments, the housing bottom 212b preferably includes a column 213 to which the tension spring 110 is preferably secured. In preferred embodiments the tension spring 110 is connected at one end to the column 213 and to the ratchet spool 300 at the second end.

In preferred embodiments, the ratchet spool 300 further includes catches 304 that operate in a manner as further discussed above in the disclosure for the catches 104. As shown in previously discussed embodiments, the tensioning device 211 could be reconfigured to include one, three, four or more tensioning cords (not shown) with appropriate reconfigurations to the housing 212 to provide additional apertures (not shown) to accommodate each of the respective tensioning cords. Although not preferred, it is also possible to reconfigure the apertures 238 to accommodate more than one tensioning cord. In the preferred embodiment of FIG. 18, including two tensioning cords 230a, 230b, the tensioning device 211 preferably includes two stoppers 108. In alternate embodiments, not shown, one stopper would suffice, but two are preferred.

As previously discussed, the catches 304 prevent the ratchet spool 300 from rotating in the wind-up direction when the catches 304 are blocked by the stoppers 108. The catches 304 can only be blocked by the stoppers 108 when the ratchet spool 300 is in the down position (when the housing teeth 318 are disengaged from the ratchet teeth 302). It is further preferred that the tensioning device 211 have at least two catches 304 preferably approximately 180 degrees apart. Alternately, 4 catches (preferably 90 degrees apart), 6 catches (preferably 60 degrees apart) or more catches, either evenly or unevenly spaced, may be provided.

The preferred actuator 400 includes the cam disc 402 and the rotation disc or key disc 404 that cooperatively engage each other and engage the top 212a of the housing 212 proximate an opening 214. As shown in the exploded perspective view in FIGS. 18 and 19, the parts of the preferred actuator 400 are assembled proximate the opening 214, one from one side of the top 212a of the housing 211 and the other from the other side. Once the actuator 400 is assembled, the rotation disc 404 and the cam disc 402 are engaged with each other and each reside at least partially within the opening 214.

The rotation disc 404 preferably has a plurality, preferably three, slots 414 on an uneven lower cam disc engaging surface 422. The uneven surface includes respective sloped surfaces 416 adjacent each of the deepest portions of each of the respective slots to a shelf 418. The cam disc 402 preferably has a plurality of cam teeth 434 on an uneven upper rotation disc engaging surface 431.

The respective discs 402, 404 engage one another within the opening 214 such that when key K is inserted into a keyhole 410 in the rotation disc 404 and rotated, the key K turns the rotation disc 404, which can rotate about 60 degrees, from a first position to a second position. When the rotation disc 404 is in the first position, the cam disc 402 will be in an up position and the respective cam teeth 434 will generally reside within the respective slots 414. As the rotation disc 404 is turned by the key, however, the sloped surfaces 416 of the respective slots 414 will ride up on respective sloped surfaces 436 of the respective cam teeth 434, until the respective cam teeth 434 are ride up on and are engaged with the shelf 418. When the cam teeth 434 are engaged with the shelf 418 and the rotation disc 404 has turned away from the first position generally about 60 degrees with respect to the axis of the ratchet spool, so that the rotation disc 404 is in the second position, the cam disc will be in a down position in which the cam disc 402 has forced the upwardly biased ratchet spool 300 downward from its up position to its down position in which the ratchet teeth 302 are no longer engaged with the housing teeth 318. If the rotation disc 404 is rotated back to the first position from the second position, the cam teeth 434 will return to the slots 414 and the wave spring 112 will bias the ratchet spool 300 upward so that the ratchet spool 300 and the cam disc 402 will return to respective up positions, allowing the ratchet teeth 302 to engage the housing teeth 318.

Figure 18:
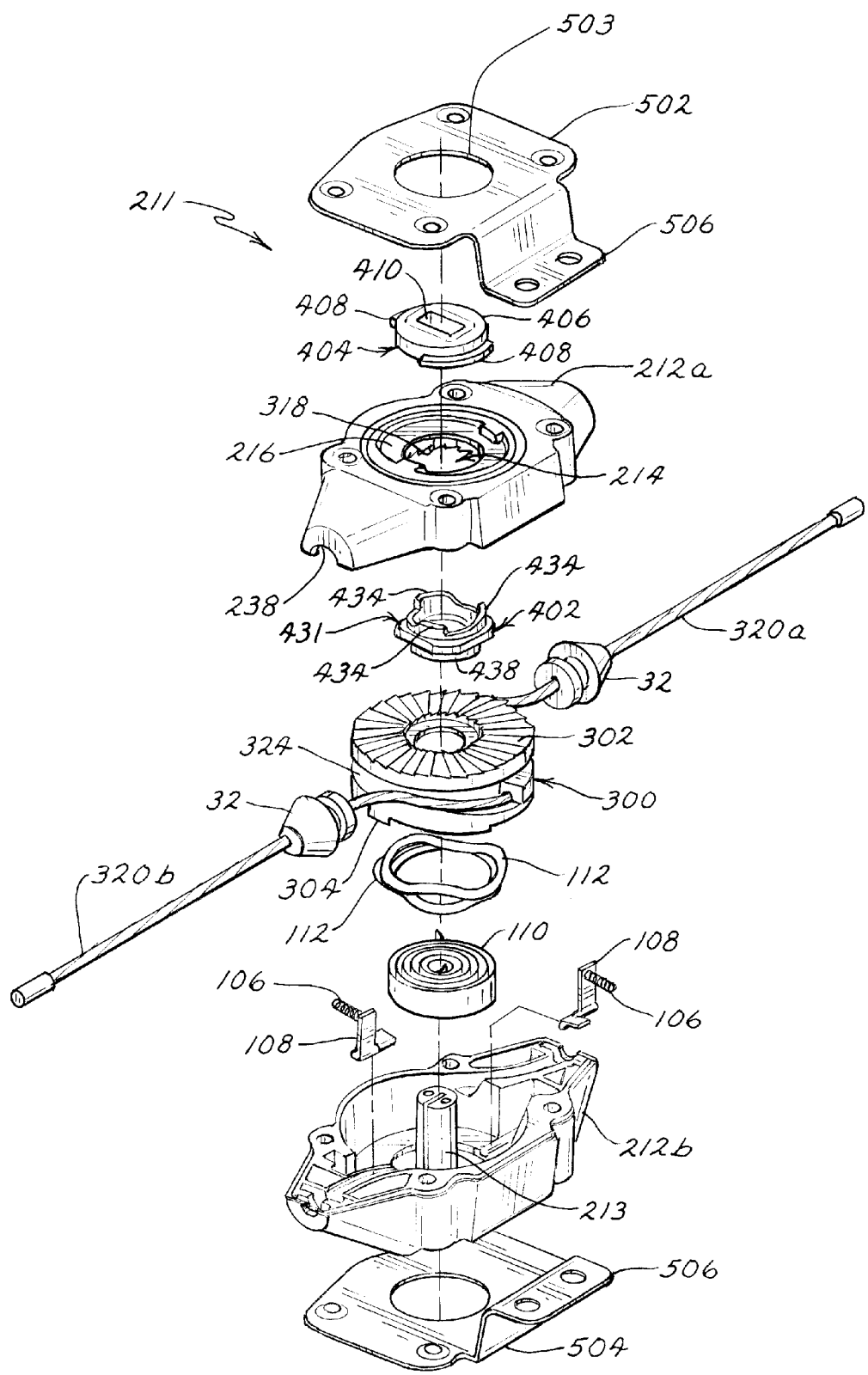
FIG. 18 is an exploded view of the tensioning device of FIG. 17.
Figure 19:
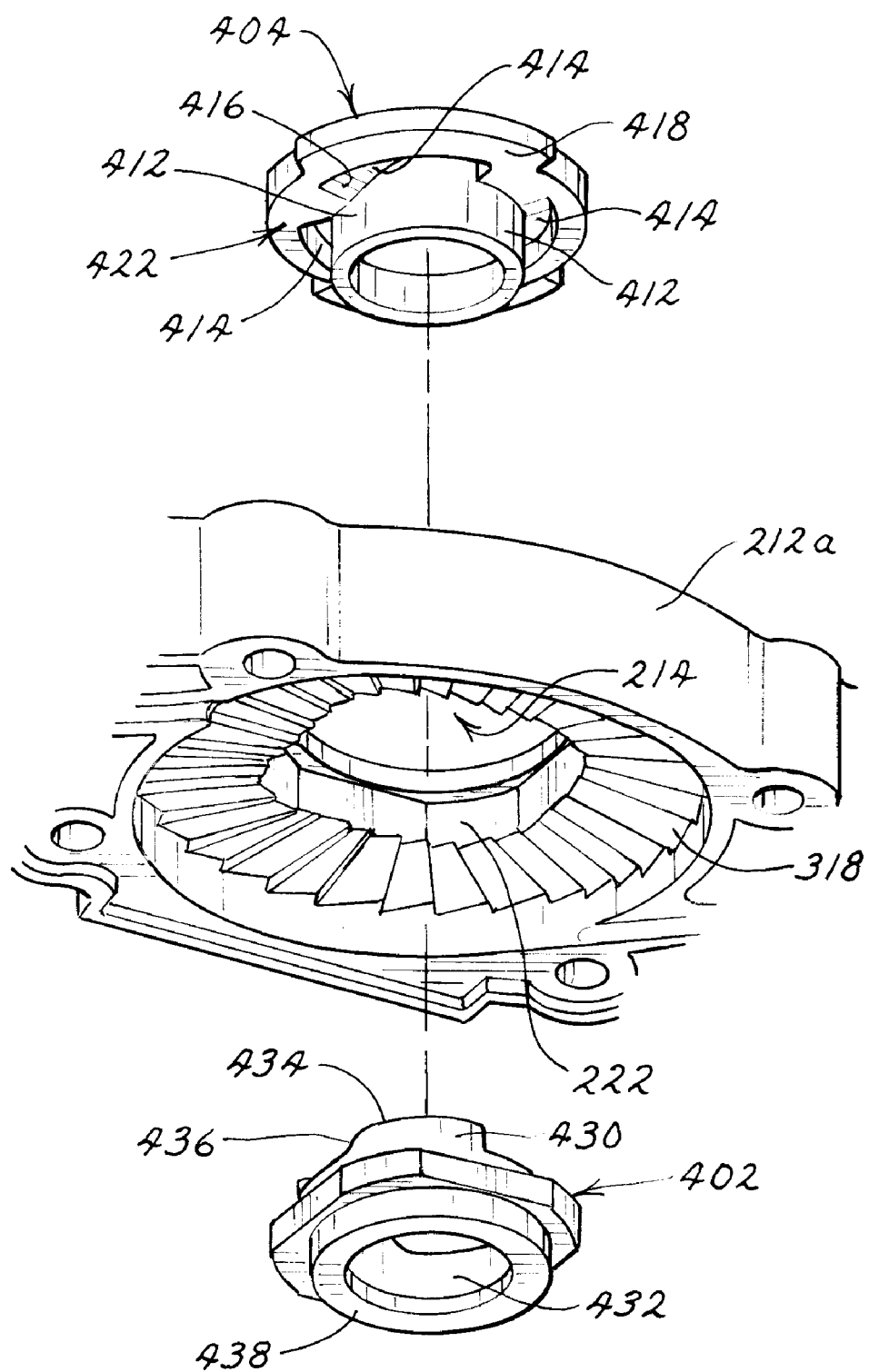
FIG. 19 is a partial, enlarged view of a rotation disc, cam disc and housing top of the tensioning device of FIG. 17.
Figure 20:
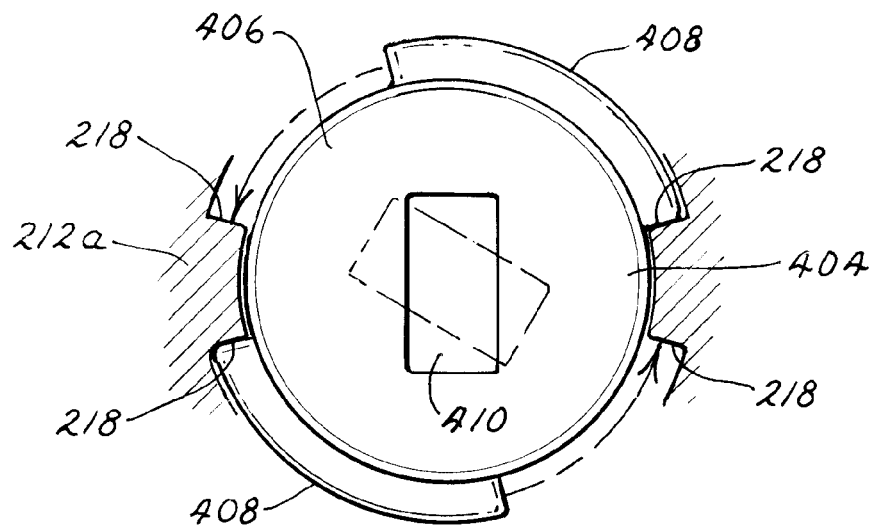
FIG. 20 is a partial, top plan view of the housing top shown in FIG. 19.
Figure 21A:
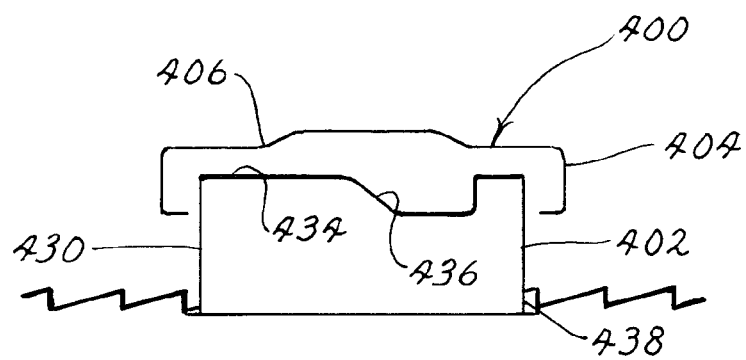
FIG. 21A is a partial, side view of the rotation disc and the cam disc shown in FIG. 19 in an engaged position in which some elements of the tensioning device are removed for clarity.
Figure 21B:
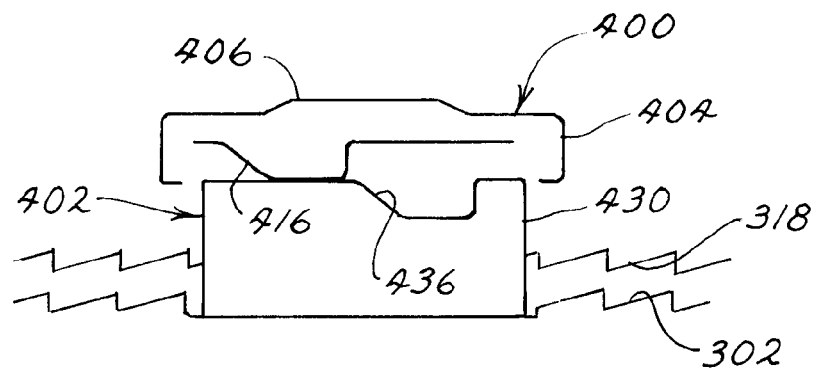
FIG. 21B is a partial, side view of the rotation disc and the cam disc shown in FIG. 19 in a disengaged in which position some elements of the tensioning device are removed for clarity.

In the preferred embodiment of the tensioning device 211 shown in FIGS. 17-18, the housing top 212a has an opening 214 and a first recess 216 in which the rotation disc 404 can be positioned and generally rotate in clockwise and counter-clockwise directions preferably about 60 degrees. The housing top 212a further preferably includes stop surfaces 218 to limit the rotational movement of the rotation disc 404 within the recess 216 (see FIG. 20). In preferred embodiments, the housing top 212a includes four stop surfaces 218. On the reverse side of the housing top 212a, proximate housing teeth 318, which preferably surround the opening 214, the housing top preferably includes a second recess 222, preferably surrounding the opening 214, in which the cam disc 402 can be positioned.

The rotation disc 404 includes a body 406 having at least one protrusion 408 extending therefrom. In approximately the center of the body 406 is a keyhole 410 or the like that provides a key recess 410 in which the key K can be positioned to enable the key K to be used to turn the rotation disc 404 and operate the actuator 400. In this embodiment, the actuator 400 is operated by inserting the key K into the keyhole 410 and rotating the rotation disc 404 by rotating the key K. The rotation disc 404 will rotate correspondingly to the rotation of the key K, so long as the rotation by both is not limited by the respective stop surfaces 218. The preferred rotation disc 404 further includes a stem 412 that is generally inserted through the opening 214 of the housing top 212a such that it is located generally within an opening 432 of the cam disc 402. The plurality of slots 414, preferably three slots 414, are preferably located within the body 406 of the rotation disc 404, opposite the keyhole 410, so that the cam teeth 434 of the cam disc 402 can slide into and out of the slots 414 as the rotation disc 404 moves from the second position to the first position and then back again to the second position. In preferred embodiments the slots 414 have a sloped surface 416 adjacent to the deepest portion of the slot 414, which provide transition surfaces for sloped surfaces 436 of the respective cam teeth 434 to slide over as the rotation disc 404 rotates from the first position to the second position. As the cam teeth 434 slide out of the slots 414 to become engaged with and ride up on the shelf 418, the cam disc 402 moves from the up position to the down position, the wave spring 212 becomes compressed and the ratchet spool 300 moves from the up position to the down position wherein the ratchet teeth 302 are disengaged from the housing teeth 318. Preferably, the cam disc 402 is constrained such that the cam disc only moves axially when the rotation disc 404 is rotated.

The preferred cam disc 402 includes a body 430 having an opening 432 for the stem 412 of the rotation disc 404 to be generally positioned therein in a manner that permits the rotation disc 404 to turn with respect to the cam disc 402. In addition, the preferred cam disc 402 includes a plurality of teeth 434 that generally correspond to the slots 414 of the rotation disc 404. Preferably the teeth 434 have sloped surfaces 436 and are arranged and configured such that as the rotation disc 404 rotates, beginning when the teeth 434 are engaged with the slots 414, the sloped surfaces 436 of the cam teeth 434 slidingly engage the sloped surfaces 416 of the respective slots 414 to a position generally out of the slot so that an engagement portion 438 of the cam disc 402 is spaced farther from the rotation disc 404, so that the engagement portion of the cam disc 402 pushes the ratchet teeth 302 away from the housing teeth 318. When the cam teeth 434 are fully engaged with the slots 414, the ratchet spool 300 is in the up and the ratchet teeth 302 and housing teeth 318 are engaged. When the cam teeth 434 are not engaged with the slots 414, the ratchet spool 300 is in the down position. In order to retain the cam disc 402 within the housing 212, the housing second recess 222 is preferably sized and configured to prevent the cam disc 402 from coming out of the housing 212. When the preferred housing 211 is assembled and the respective parts of actuator 400 are engaged at least partially within the opening 214, the rotation disc 404 is secured to the housing 212 with a bracket 500. In the preferred embodiment shown in FIG. 17, the bracket 500 includes a first piece 502 with a window 503 and a second piece 504 that can be secured together with fasteners secured to the housing 211. Each piece 502, 504 is provided with an outwardly extending flange 506 that is arranged and configured to be connected to a cross chain attachment link 508 or the like. The cross chain attachment link 508 can be secured to the snow chain 14 as shown in FIG. 22. The embodiment illustrated in FIGS. 17-21B is particularly preferred for use with large trucks where use will be frequent and reliability is at a premium. It will be appreciated that rotation disc 404 is not as exposed to potential breakage as the lever 26 of the earlier embodiment and that this new and novel actuation mechanism is less subject to breakage because it is better contained within the housing.

Furthermore, the bracket 500 is designed to strengthen the device and shield the housing and the other working parts of the tensioning device from the impact of any objects which forcefully strike the device. It will be understood that the actuator 400 can be used to position the ratchet spool in embodiments including a number of cords that is not equal to two; i.e. one, three, four or more. In alternate embodiments the bracket can be a single piece construction.

The preferred tensioning device 211 for placing tension on a snow chain 14 for attachment to a wheel 16 of a vehicle to provide additional traction includes a housing 212 including at least one aperture 238; a bottom 212b having a top surface; and a top 212a having an opening 214 and a set of housing teeth 318 on an underside of the top 212a. The tensioning device 211 also includes at least one tensioning cord 320a, 320b and a ratchet spool 300 including an upper surface and an under surface. The ratchet spool 300 has a set of ratchet teeth 302 on the upper surface and the ratchet teeth are constructed and arranged to mate with the housing teeth 318. The tensioning cord(s) 320a, 320b are interconnected with the ratchet spool 300 and a tension spring 110 is interconnected with the ratchet spool and the housing 212. In preferred embodiments of this tensioning device 211, the ratchet spool 300 includes a channel 324 in which sufficient space is provided to receive at least one tensioning cord 320a, 320b between the upper surface and the under surface. The tension spring 110 is constructed and arranged to place a bias on the ratchet spool 300 toward a wind-up direction. The tensioning device 211, preferably includes at least one wave spring 112 positioned between the top surface of the bottom 212b of the housing 212 and the under surface of the ratchet spool 300 so as to bias the ratchet spool upward toward engagement with the housing teeth 318. The preferred tensioning device 211 further includes an actuator 400 engaged at least partially within the opening 214 and recess 216 in the top 212a of the housing 212. The preferred actuator 400 includes a rotation disc 404 and a cam disc 402. The cam disc 402 has an up position (see FIG. 21A) and a down position (see FIG. 21B) and the rotation disc 404 has a first position and a second position. When the cam disc 402 is in the up position, the wave spring 112 can push the ratchet spool 300 upward such that the ratchet teeth 302 are engaged with the housing teeth 318 and, when the cam disc 402 is in the down position, the ratchet teeth 302 are disengaged from the housing teeth 318. Preferably, the rotation disc 404 can rotate within the recess 216 and the opening 214 so as to move from the first position to the second position; wherein the rotation disc 404 depresses the cam disc 402 from the up position to the down position when the rotation disc rotates from the first position to the second position. The tensioning device 211 can be interconnected with the snow chain 14 so that the tensioning cord(s) 320a, 320b can place a tension on the snow chain 14 to secure the snow chain to a wheel 16.

In preferred embodiments of this tensioning device 211, the opening 214 will be surrounded by the set of housing teeth 318 on the underside of the top 212a of the housing 212. In preferred embodiments of this tensioning device 211, the cam disc 402 will have an uneven upper rotation disc engaging surface 431 and a ratchet spool engaging surface 438 and the rotation disc 404 will have an uneven lower cam disc engaging surface 422 that engages the uneven upper rotation disc engaging surface 431 of the cam disc 402 so that when the rotation disc 404 is rotated, the uneven lower cam disc engaging surface 422 can move from a first position with respect to the uneven upper rotation disc engaging surface 431 to a second position with respect to the uneven upper rotation disc engaging surface 431. As the rotation disc 404 moves from the first position to the second position, the rotation disc 404 moves the cam disc 402 from the up position to the down position, thereby disengaging the ratchet teeth 302 from the housing teeth 318 so that the tensioning cord(s) 320a, 320b can be drawn out of the housing 212 against the biasing force provided by the tension spring 110 on the ratchet spool 300.

FIGS. 22-23 generally illustrate a preferred self-tightening show chain 210 including the tensioning device 211 of FIG. 17 secured to a snow chain 14. Preferably, an attachment device 600, 700 or the like is secured to each distal end of the tensioning cord(s) 320a, 320b. It will be understood that attachment devices 600, 700 are merely illustrative and are not intended to be limiting in any way. As illustrated in FIG. 1, a hook 18 is another example of such an attachment device. Preferably, the attachment devices 18, 500 and 600 are detachable from the snow chain 14 so that the self-tensioning snow chain 210 can be easily secured to the wheel 16, unlike the cross chain attachment link 508, which is intended to remain secured to the snow chain 14. As is best illustrated in FIG. 23, one preferred attachment device 700 includes a fastening plate 702 having a slot 706. The plate is secured to the snow chain 14. The distal end of the respective tensioning cord 320a includes a fastening clip 712 having a knob 716 that may be inserted and removably secured within the slot 706.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A self-tensioning snow chain for attachment to a wheel of a vehicle, the self-snow chain comprising:
    a snow chain; and
    a tensioning device including:
        a housing including two apertures and a top and a bottom, the top having a set of housing teeth, a bottom; the top and the bottom having respective outer surfaces;
        a bracket secured to the respective outer surfaces of the top and the bottom of the housing to generally shield the outer surfaces of the housing, the bracket including a cross chain attachment link; wherein the cross chain attachment link is secured to the snow chain;
        a ratchet spool having a set of ratchet teeth;
    two tensioning cords interconnected to the ratchet spool, each of the respective cords extending through one aperture; and
        an actuator engaged with the housing, the actuator arranged and configured to selectively actuate the engagement and disengagement of the ratchet teeth with the housing teeth; wherein each of the respective tensioning cords can be engaged with the snow chain to secure the snow chain to the wheel; wherein the ratchet spool further includes a catch on a lower surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

2. The self-tensioning snow chain of claim 1, wherein the bracket includes a first piece and a second piece, and the bracket secures parts of the actuator to the housing and the bracket includes an opening encircling the actuator, wherein a key can operate the actuator; the first piece secured generally to the outer surface of the housing top and the second piece secured generally to the outer surface of the housing bottom; wherein the cross chain link attachment is secured to both the first and second pieces.

3. The self-tensioning snow chain of claim 1, the tensioning device further including a tension spring interconnected with the ratchet spool, the tension spring constructed and arranged to place a bias on the ratchet spool in a wind-up direction; and a wave spring positioned between a top surface of the housing bottom and the ratchet spool to bias the ratchet spool in the direction of the housing teeth.

4. The self-tensioning snow chain of claim 1, wherein the actuator includes a rotation disc and a cam disc and the cam disc is arranged and configured so that the cam disc can press the ratchet spool into a down position when the actuator is operated; wherein the cam disc pushes the ratchet teeth away from the housing teeth when the ratchet spool is pushed from an up position to a down position.

5. The self-tensioning snow chain of claim 1, further including a second tensioning device; wherein the two tensioning devices are approximately 180 degrees from each other with respect to the center of the wheel when the self-tensioning snow chain is secured to the wheel.

6. The self-tensioning snow chain of claim 1, wherein the actuator of each tensioning device includes a rotation disc and a cam disc, wherein the cam disc has an uneven upper rotation disc engaging surface and a ratchet spool engaging surface; the rotation disc has an uneven lower cam disc engaging surface that engages the uneven upper rotation disc engaging surface of the cam disc so that when the rotation disc is rotated, the uneven lower cam disc engaging surface can move from a first position with respect to the uneven upper rotation disc engaging surface to a second position with respect to the uneven upper rotation disc engaging surface so as to move the cam disc from an up position to a down position, thereby disengaging the ratchet teeth from the housing teeth so that the tensioning cord can be drawing out of the housing against the biasing force provided by the tension spring on the ratchet spool.

7. A self-tensioning snow chain for attachment to a wheel of a vehicle, the self-tensioning snow chain comprising:
a snow chain; and
a tensioning device including:
a housing having at least one aperture, a bottom having a top surface and a top having a set of housing teeth;
an actuator engaged with the housing;
a ratchet spool including upper and lower surfaces; the ratchet spool having a set of ratchet teeth on the upper surface, the ratchet teeth constructed and arranged to mate with the housing teeth;
a cord; the cord being interconnected with the ratchet spool; and
a tension spring interconnected with the ratchet spool, the tension spring constructed and arranged to place a bias on the ratchet spool in a wind-up direction so that the cord can be wound up on the ratchet spool; wherein the ratchet spool is biased upwardly in the direction of the housing teeth so that the ratchet teeth will be engaged with the housing teeth when the ratchet spool is in an up position; wherein the actuator can push the ratchet spool downward, against the biasing force, into a down position to disengage the ratchet teeth and the housing teeth; and wherein the snow chain is interconnected with the tensioning device and the cord can be connected with the snow chain so that the tensioning device can secure the snow chain to the wheel;
wherein the ratchet spool further includes a catch on the lower surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

8. The self-tensioning snow chain of claim 7, wherein the ratchet teeth and the housing teeth are undercut at an angle of more than 90 degrees to a horizontal plane perpendicular to a vertical axis of the ratchet spool and the housing.

9. The self-tensioning snow chain of claim 8, wherein the angle is from about 3 to about 30 degrees more than a 90 degree angle to a horizontal plane perpendicular to a vertical axis of the ratchet spool and the housing.

10. The self-tensioning snow chain of claim 7, wherein the actuator is operated with a key.

11. The self-tensioning snow chain of claim 7, wherein the actuator is arranged and configured so that it can press the ratchet spool into a down position when the actuator is operated.

12. The self-tensioning snow chain of claim 7, wherein the actuator includes a rotation disc that can engage a cam disc when the rotation disc is rotated.

13. The self-tensioning snow chain of claim 12, wherein the cam disc has an engagement portion that can push the ratchet teeth away from the housing teeth when the rotation disc is engaged with the cam disc.

14. The self-tensioning snow chain of claim 12, wherein the cam disc is arranged and configured so that the cam disc can press the ratchet spool in a down position when the actuator is operated; wherein the cam disc pushes the ratchet teeth away from the housing teeth when the rotation disc is engaged with the cam disc and when the ratchet spool is in a down position.

15. The self-tensioning snow chain of claim 12, wherein the cam disc remains generally perpendicular to the housing top as the rotation disc is rotated.

16. The self-tensioning snow chain of claim 15, wherein the rotation disc includes a body having at least one protrusion extending therefrom; wherein the protrusion contacts a stop surface to limit the rotational movement of the rotation disc.

17. The self-tensioning snow chain of claim 16, wherein the rotation disc includes two opposing protrusions and the housing top includes four stop surfaces.

18. The self-tightening snow chain of claim 17, further comprising a bracket securing the actuator to the housing, the bracket being interconnected to the snow chain.

19. The self-tightening snow chain of claim 17, wherein the tensioning device further includes a wave spring positioned between the top surface of the bottom of the housing and the lower surface of the ratchet spool to bias the ratchet spool upward in the direction of the housing teeth so that the ratchet teeth will be engaged with the housing teeth when the ratchet spool is biased into the up position by the wave spring.

20. The self-tensioning snow chain of claim 12, wherein the housing teeth generally encircle and are proximate to the cam disc.

21. The self-tensioning snow chain of claim 7, wherein the housing top includes a recess in which the a rotation disc is positioned, the housing top further including at least one stop surface to limit the rotational movement of the rotation disc within the recess.

22. The self-tensioning snow chain of claim 7, wherein the housing includes two apertures and wherein the tensioning device include two cords interconnected with the ratchet spool and the cords extend out of the two apertures in the housing.

23. The self-tensioning snow chain of claim 7, wherein the actuator is engaged at least partially within an opening in the top of the housing; the actuator including a rotation disc and a cam disc; the cam disc having an up position and a down position and the rotation disc having a first position and a second position; wherein, when the cam disc is in the up position, the ratchet spool is pressed upward such that the ratchet teeth are engaged with the housing teeth and, when the cam disc is in the down position, the ratchet teeth are disengaged from the housing teeth; wherein the rotation disc can rotate within the opening so as to move from a first position to a second position; wherein the rotation disc depresses the cam disc from the up position to the down position when the rotation disc rotates from the first position to the second position; wherein the tensioning device can be interconnected with the snow chain so that the tensioning cord can place a tension on the snow chain to secure the snow chain to the wheel.

24. The self-tensioning snow chain of claim 7, wherein a joint between the top and bottom of the housing is constructed and arranged to include a lip and ridge configuration.

25. The self-tensioning snow chain of claim 7, wherein each cord includes:
- a first and second end;
- a first knob at the first end of the cord;
- a second knob at the second end of the cord; and
- a grommet encircling the cord wherein the grommet has an opening through which the cord passes that is smaller in diameter than a smallest diameter of either of the first knob and the second knob; wherein the grommet is engaged with the housing between the top and the bottom proximate the aperture.

26. A tensioning device for placing tension on a snow chain for attachment to a wheel of a vehicle to provide traction, the tensioning device comprising:
- a housing having at least one aperture, a bottom having a top surface and a top having a set of housing teeth;
- an actuator engaged with the housing;
- a ratchet spool including upper and lower surfaces; the ratchet spool having a set of ratchet teeth on the upper surface, the ratchet teeth constructed and arranged to mate with the housing teeth;
- a cord; the cord being interconnected with the ratchet spool; and
- a tension spring interconnected with the ratchet spool, the tension spring constructed and arranged to place a bias on the ratchet spool in a wind-up direction so that the cord can be wound up on the ratchet spool; wherein the ratchet spool is biased upwardly in the direction of the housing teeth so that the ratchet teeth will be engaged with the housing teeth when the ratchet spool is in an up position; wherein the actuator can push the ratchet spool downward, against the biasing force, into a down position to disengage the ratchet teeth and the housing teeth; and wherein the snow chain is interconnected with the tensioning device and the cord can be connected with the snow chain so that the tensioning device can secure the snow chain to the wheel;
- wherein the ratchet spool further includes a catch on the lower surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

27. The tensioning device of claim 26, wherein the ratchet spool has an up position and a down position; wherein the ratchet teeth engage the housing teeth when the ratchet spool is in the up position and the ratchet teeth do not engage the housing teeth when the ratchet spool is in the down position.

28. The tensioning device of claim 26, wherein the actuator is operated with a key.

29. The tensioning device of claim 26, wherein the actuator is arranged and configured so that the actuator can press the ratchet spool in a down position when the actuator is operated.

30. The tensioning device of claim 26, wherein the actuator includes a rotation disc that can engage a cam disc when the rotation disc is rotated.

31. The tensioning device of claim 30, wherein the cam disc has an engagement portion that can push the ratchet teeth away from the housing teeth when the rotation disc is engaged with the cam disc.

32. The tensioning device of claim 31, wherein the cam disc is arranged and configured so that the cam disc can press the ratchet spool in a down position when the actuator is operated; wherein the cam disc pushes the ratchet teeth away from when the ratchet spool is in a down position.

33. The tensioning device of claim 31, wherein the cam disc remains generally perpendicular to the housing top as the rotation disc is rotated.

34. The tensioning device of claim 30, wherein the housing teeth generally encircle and are proximate to the cam disc.

35. The tensioning device of claim 26, wherein the housing top includes a recess in which a rotation disc is positioned, the housing top further including at least one stop surface to limit the rotational movement of the rotation disc within the recess.

36. The tensioning device of claim 35, wherein the rotation disc includes a body having at least one protrusion extending therefrom; wherein the protrusion contacts the stop surface to limit the rotational movement of the rotation disc within the recess.

37. The tensioning device of claim 35, wherein the rotation disc includes two opposing protrusions and the housing top includes four stop surfaces.

38. The tensioning device of claim 26, wherein the housing includes two apertures and wherein the tensioning device include two cords interconnected with the ratchet spool and the cords extend out of the two apertures in the housing.

39. The tensioning device of claim 26, wherein the actuator is interconnected to the housing top.

40. The tensioning device of claim 26, wherein the spool will not rotate more than 360 degrees in the wind-up direction when the ratchet spool is in a down position.

41. The tensioning device of claim 26, wherein the housing top and housing bottom have respective outer surfaces, the tensioning device further comprising a bracket secured to the outer surfaces of the top and the bottom of the housing to generally shield the outer surfaces of the housing, the bracket including a cross chain attachment link.

42. The tensioning device of claim 26, wherein the ratchet teeth and the housing teeth are undercut at an angle of from about 3 to about 30 degrees more than a 90 degree angle to a horizontal plane perpendicular to a vertical axis of the ratchet spool and the housing.

43. The tensioning device of claim 26, wherein the actuator is engaged at least partially within an opening in the top of the housing; the actuator including a rotation disc and a cam disc; the cam disc having an up position and a down position and the rotation disc having a first position and a second position; wherein, when the cam disc is in the up position, the ratchet spool is pressed upward such that the ratchet teeth are engaged with the housing teeth and, when the cam disc is in the down position, the ratchet teeth are disengaged from the housing teeth; wherein the rotation disc can rotate within the opening so as to move from a first position to a second position; wherein the rotation disc depresses the cam disc from the up position to the down position when the rotation disc rotates from the first position to the second position; wherein the tensioning device can be interconnected with the snow chain so that the tensioning cord can place a tension on the snow chain to secure the snow chain to the wheel.

44. The tensioning device of claim 26, wherein a joint between the top and the bottom is constructed and arranged to include a lip and ridge configuration.

45. The tensioning device of claim 26, wherein the cord includes:
   a first and second end;
   a first knob at the first end of the cord;
   a second knob at the second end of the cord; and
   a grommet encircling the cord wherein the grommet has an opening through which the cord can pass that has a diameter that is constructed and arranged to prevent the passage of the first or second knob through the opening.

46. The tensioning device of claim 26, further comprising a bracket securing the actuator to the housing.

47. The tensioning device of claim 26, wherein the tensioning device further includes a wave spring positioned between the top surface of the bottom of the housing and the lower surface of the ratchet spool to bias the ratchet spool upward in the direction of the housing teeth so that the ratchet teeth will be engaged with the housing teeth when the ratchet spool is biased into the up position by the wave spring.

48. A self-tensioning snow chain for attachment to a wheel of a vehicle to provide traction, the self-tensioning snow chain comprising:
   a snow chain for securing around the wheel of the vehicle; and
   a tensioning device including:
   a housing including at least one aperture; a bottom having a top surface; and a top having an opening and a set of housing teeth on an underside of the top;
   a tensioning cord;
   a ratchet spool including an upper surface and an under surface;
   a set of ratchet teeth on the upper surface, the ratchet teeth being constructed and arranged to mate with the housing teeth; the tensioning cord being interconnected with the ratchet spool;
   a tension spring interconnected with the ratchet spool and the housing, the tension spring constructed and arranged to place a bias on the ratchet spool in a wind-up direction;
   a wave spring positioned between the top surface of the bottom of the housing and the under surface of the ratchet spool so as to bias the ratchet spool upward in engagement with the housing teeth; and
   an actuator engaged at least partially within the opening in the top of the housing;
   the actuator including a rotation disc and a cam disc; the cam disc having an up position and a down position and the rotation disc having a first position and a second position; wherein, when the cam disc is in the up position, the wave spring can push the ratchet spool upward such that the ratchet teeth are engaged with the housing teeth and, when the cam disc is in the down position, the ratchet teeth are disengaged from the housing teeth; wherein the rotation disc can rotate within the opening so as to move from the first position to the second position; wherein the rotation disc depresses the cam disc from the up position to the down position when the rotation disc rotates from the first position to the second position; wherein the tensioning device can be interconnected with the snow chain so that the tensioning cord can place a tension on the snow chain to secure the snow chain to the wheel.

49. The self-tensioning snow chain of claim 48, further comprising a bracket securing the rotation disc within the housing.

50. The self-tensioning snow chain of claim 48, wherein the ratchet spool further includes a catch on the under surface of the ratchet spool and the tensioning device further includes a stopper having an up position and a down position, the stopper being biased in the up position in which the stopper will block the catch when the ratchet spool is in the down position so that the ratchet spool will not rotate more than 360 degrees in the wind-up direction when the ratchet spool is in a down position.

51. The self-tensioning snow chain of claim 48, wherein the ratchet teeth and the housing teeth are undercut at an angle of more than 90 degrees to a horizontal plane perpendicular to a vertical axis of the ratchet spool and the housing.

52. The self-tensioning snow chain of claim 48, wherein the rotation disc can be operated with a key.

53. The self-tensioning snow chain of claim 48, wherein the cam disc is arranged and configured so that the cam disc can press the ratchet spool in a down position when the actuator is operated; wherein the cam disc pushes the ratchet teeth away from the housing teeth when the rotation disc is engaged with the cam disc and when the ratchet spool is pushed from an up position to a down position.

54. The self-tensioning snow chain of claim 48, wherein the housing top opening includes a recess in which the rotation disc is positioned, the housing top further including at least one stop surface to limit the rotational movement of the rotation disc within the recess; wherein the cam disc remains generally perpendicular to the housing top as the rotation disc is rotated.

55. The self-tensioning snow chain of claim 48, wherein the housing includes two apertures and wherein the tensioning device includes two tensioning cords interconnected with the ratchet spool and each of the tensioning cords extend out of the housing through one of the respective apertures.

56. The self-tensioning snow chain of claim 48, wherein the ratchet spool includes a channel in which sufficient space is provided to receive the tensioning cord between the upper surface and the under surface.

57. The self-tensioning snow chain of claim 48, wherein the cam disc has an uneven upper rotation disc engaging surface and a ratchet spool engaging surface; the rotation disc has an uneven lower cam disc engaging surface that engages the uneven upper rotation disc engaging surface of the cam disc so that when the rotation disc is rotated, the uneven lower cam disc engaging surface can move from a first position with respect to the uneven upper rotation disc engaging surface to a second position with respect to the uneven upper rotation disc engaging surface so as to move the cam disc from the up position to the down position, thereby disengaging the ratchet teeth from the housing teeth so that the tensioning cord can be drawing out of the housing against the biasing force provided by the tension spring on the ratchet spool.

* * * * *